US012739019B2

(12) United States Patent
Meyer et al.

(10) Patent No.: US 12,739,019 B2
(45) Date of Patent: Sep. 15, 2026

(54) REFLECTIVE DEVICES FOR CONVEYING RADIO-FREQUENCY SIGNALS

(71) Applicant: Apple Inc., Cupertino, CA (US)

(72) Inventors: Stefan Meyer, Hoechstadt (DE); Jan Ellenbeck, Gruenwald (DE); Bertram R Gunzelmann, Koenigsbrunn (DE); Norman Goris, Dortmund (DE)

(73) Assignee: Apple Inc., Cupertino, CA (US)

(*) Notice: Subject to any disclaimer, the term of this patent is extended or adjusted under 35 U.S.C. 154(b) by 405 days.

(21) Appl. No.: 18/322,950

(22) Filed: May 24, 2023

(65) Prior Publication Data

US 2023/0421241 A1 Dec. 28, 2023

Related U.S. Application Data

(60) Provisional application No. 63/355,364, filed on Jun. 24, 2022.

(51) Int. Cl.
*H04B 7/145* (2006.01)
*H04B 7/04* (2017.01)

(52) U.S. Cl.
CPC ......... *H04B 7/145* (2013.01); *H04B 7/04013* (2023.05)

(58) Field of Classification Search
CPC .......................... H04B 7/145; H04B 7/04013; H04B 7/15528; H04B 7/0617; H04B 7/06952; H01Q 15/147; H01Q 3/20; H01Q 3/46; H01Q 3/01; H01Q 1/246
See application file for complete search history.

(56) References Cited

U.S. PATENT DOCUMENTS

| | | | | |
|---|---|---|---|---|
| 2019/0044549 | A1* | 2/2019 | Pillai | H04B 1/385 |
| 2020/0371420 | A1* | 11/2020 | Wood | G06T 13/40 |
| 2021/0058137 | A1 | 2/2021 | Shahvirdi Dizaj Yekan et al. | |
| 2022/0236181 | A1* | 7/2022 | Volkovich | G01B 11/0625 |
| 2023/0176174 | A1* | 6/2023 | Penna | H04B 7/145 |
| 2024/0137105 | A1* | 4/2024 | Lee | H04B 7/04013 |
| 2024/0213656 | A1* | 6/2024 | Liu | H01Q 15/18 |

(Continued)

FOREIGN PATENT DOCUMENTS

| | | | | |
|---|---|---|---|---|
| EP | 1026780 | A1 * | 8/2000 | H01Q 15/14 |
| IT | TO20100236 | A1 * | 9/2011 | H01Q 3/46 |

(Continued)

*Primary Examiner* — Lana N Le

(74) *Attorney, Agent, or Firm* — Treyz Law Group, P.C.; Michael H. Lyons

(57) ABSTRACT

A wireless access point (AP) may communicate with a user equipment (UE) device via reflection off a reflective device having an array of fixed or adjustable reflectors in different orientations. The AP may illuminate different portions of an area by pointing a signal beam to different reflectors and/or by controlling the reflective device to electrically rotate the reflectors. The AP may calibrate the position of the reflective device and may establish wireless communications with the UE device by performing a sweep of signal beams over the reflectors and/or by controlling the reflective device to sweep over different reflector orientations. The AP may track movement of the UE device over time. The AP may sweep the AP beam over a subset of the reflectors around an active reflector to maintain communications with the UE device even as the UE device moves over time.

20 Claims, 16 Drawing Sheets

(56) References Cited

U.S. PATENT DOCUMENTS

| | | | | |
|---|---|---|---|---|
| 2025/0015877 | A1* | 1/2025 | Nam | H04B 7/15528 |
| 2025/0096852 | A1* | 3/2025 | Tong | H04B 7/04013 |

FOREIGN PATENT DOCUMENTS

| | | | | | |
|---|---|---|---|---|---|
| JP | 2016036084 | A | * | 3/2016 | H01Q 15/14 |
| JP | 2018007437 | A | * | 1/2018 | H04B 7/04 |
| WO | 2021221603 | A1 | | 11/2021 | |
| WO | 2022007417 | A1 | | 1/2022 | |

* cited by examiner

REFLECTIVE DEVICES FOR CONVEYING RADIO-FREQUENCY SIGNALS

This application claims the benefit of U.S. Provisional Patent Application No. 63/355,364, filed Jun. 24, 2022, which is hereby incorporated by reference herein in its entirety.

FIELD

This disclosure relates generally to electronic devices and, more particularly, to electronic devices with wireless circuitry.

BACKGROUND

Electronic devices are often provided with wireless capabilities. An electronic device with wireless capabilities has wireless circuitry that includes one or more antennas. The wireless circuitry is used to perform communications using radio-frequency signals conveyed by the antennas.

As software applications on electronic devices become more data-intensive over time, demand has grown for electronic devices that support wireless communications at higher data rates. However, the maximum data rate supported by electronic devices is limited by the frequency of the radio-frequency signals. As the frequency of the radio-frequency signals increases, it can become increasingly difficult to perform satisfactory wireless communications because the signals become subject to significant over-the-air attenuation and typically require line-of-sight.

SUMMARY

A wireless system may include a wireless access point (AP) and a user equipment (UE) device. The AP and the UE device may communicate using wireless signals at relatively high frequencies. The AP may convey wireless signals within a corresponding AP beam. When a line of sight (LOS) between the AP and the UE device is blocked or otherwise offers insufficient wireless performance, the AP and the UE may communicate by reflecting the wireless signals off a reflective device.

The reflective device may have an array of reflectors. Each reflector may be oriented in a respective orientation. The reflectors may be fixed or may be electrically adjustable. Each reflector may have a respective field of view (FOV). The reflectors across the array may collectively cover a wide FOV. The AP may illuminate different portions of the wide FOV by changing the AP beam to illuminate different reflectors in the reflective device. Additionally or alternatively, the AP may control the reflective device to electrically rotate the reflectors to cover different portions of the wide FOV. This may allow the AP to communicate with one or more UE devices at different locations even when there are no LOS paths. The reflective device may be less expensive, may consume less power, and may involve less control overhead than scenarios where a reconfigurable intelligent surface (RIS) of programmable antenna elements is used to reflect wireless signals between the AP and the UE devices.

The AP may calibrate the position/orientation of the reflective device with respect to the AP. Once calibrated, the AP may establish wireless communications with the UE device by performing a sweep of AP beams over the reflectors of the reflective device. If desired, the AP may also control the reflective device to sweep over different reflector orientations. The AP may transmit reflector-specific or reflector and orientation-specific preambles during the sweeps. The UE device may transmit a measurement report to the AP based on wireless performance metric data gathered during the sweeps. The AP may select an optimal reflector and AP beam to use based on the measurement report. The optimal reflector and AP beam may be the reflector and AP beam that were used when the UE device was able to successfully receive one of the transmitted preambles, for example. The AP may track movement of the UE device over time. The AP may sweep the AP beam over a subset of the reflectors around the active reflector to maintain communications with the UE device even as the UE device moves over time.

An aspect of the disclosure provides a reflective device. The reflective device can include a support. The reflective device can include a first reflective panel having a first orientation relative to the support. The reflective device can have a second reflective panel having a second orientation relative to the support, wherein the second orientation is different from the first orientation, the first reflective panel and the second reflective panel being configured to reflect radio-frequency signals between a wireless access point and one or more user equipment (UE) devices.

An aspect of the disclosure provides a radio-frequency reflective device. The radio-frequency reflective device can include a support. The radio-frequency reflective device can include an array of reflective panels mounted to the support, wherein the array of reflective panels is configured to reflect radio-frequency signals at a frequency greater than or equal to 10 GHz between a first electronic device and a second electronic device and each reflective panel in the array of reflective panels has a respective field of view.

An aspect of the disclosure provides a method of operating a reflective device to convey wireless signals between a wireless access point and one or more user equipment (UE) devices. The method can include with one or more electromechanical actuators, rotating reflectors in an array of reflectors to a first set of orientations with respect to a support. The method can include with the array of reflectors, reflecting a set of signal beams from the wireless access point while the reflectors in the array of reflectors are in the first set of orientations, each signal beam in the set of signal beams overlapping a respective one of the reflectors in the array of reflectors. The method can include with the one or more electromechanical actuators, rotating the reflectors in the array of reflectors from the first set of orientations to a second set of orientations with respect to the support that is different from the first set of orientations. The method can include with the array of reflectors, reflecting the set of signal beams from the wireless access point while the reflectors in the array of reflectors are in the second set of orientations.

DETAILED DESCRIPTION

Figure 1:
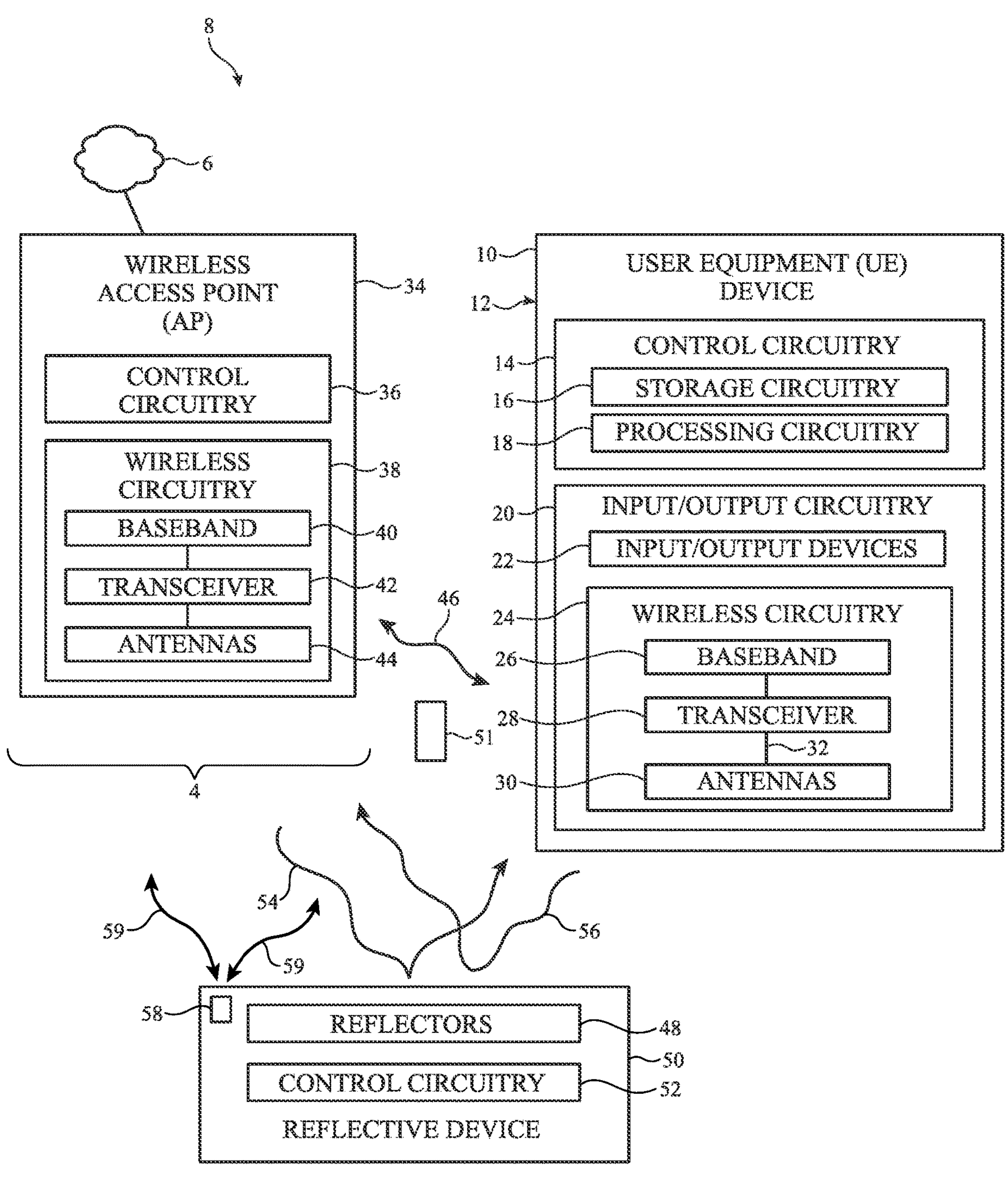
FIG. 1 is a schematic block diagram of an illustrative communications system having a user equipment (UE) device, a wireless access point (AP), and a reflective device in accordance with some embodiments.

FIG. 1 is a schematic diagram of an illustrative communications system 8 (sometimes referred to herein as communications network 8) for conveying wireless data between communications terminals. Communications system 8 may include network nodes (e.g., communications terminals). The network nodes may include user equipment (UE) such as one or more UE devices 10. The network nodes may also include external communications equipment (e.g., communications equipment other than UE devices 10) such as external communications equipment 34. External communications equipment 34 (sometimes referred to herein simply as external equipment 34) may include one or more electronic devices and may be a wireless base station, wireless access point, or other wireless equipment. Implementations in which external communications equipment 34 is a wireless access point are described herein as an example. External communications equipment 34 may therefore sometimes be referred to herein as wireless access point (AP) 34.

AP 34 may be communicably coupled to one or more other network nodes 6 in a larger communications network 4 via wired and/or wireless links Network 4 may include one or more wired communications links (e.g., communications links formed using cabling such as ethernet cables, radio-frequency cables such as coaxial cables or other transmission lines, optical fibers or other optical cables, etc.), one or more wireless communications links (e.g., short range wireless communications links that operate over a range of inches, feet, or tens of feet, medium range wireless communications links that operate over a range of hundreds of feet, thousands of feet, miles, or tens of miles, and/or long range wireless communications links that operate over a range of hundreds or thousands of miles, etc.), communications gateways, wireless access points, base stations, switches, routers, servers, modems, repeaters, telephone lines, network cards, line cards, portals, user equipment (e.g., computing devices, mobile devices, etc.), etc. Network 4 may include communications (network) nodes or terminals coupled together using these components or other components (e.g., some or all of a mesh network, relay network, ring network, local area network, wireless local area network, personal area network, cloud network, star network, tree network, or networks of communications nodes having other network topologies), the Internet, combinations of these, etc. UE devices 10 may send data to and/or may receive data from other nodes or terminals in network 4 via AP 34 (e.g., AP 34 may serve as an interface between user equipment devices 10 and the rest of the larger communications network).

User equipment (UE) device 10 of FIG. 1 is an electronic device (sometimes referred to herein as electronic device 10 or device 10) and may be a computing device such as a laptop computer, a desktop computer, a computer monitor containing an embedded computer, a tablet computer, a cellular telephone, a media player, or other handheld or portable electronic device, a smaller device such as a wristwatch device, a pendant device, a headphone or earpiece device, a device embedded in eyeglasses, goggles, or other equipment worn on a user's head, or other wearable or miniature device, a television, a computer display that does not contain an embedded computer, a gaming device, a navigation device, an embedded system such as a system in which electronic equipment with a display is mounted in a kiosk or automobile, a wireless internet-connected voice-controlled speaker, a home entertainment device, a remote control device, a gaming controller, a peripheral user input device, equipment that implements the functionality of two or more of these devices, or other electronic equipment.

As shown in the functional block diagram of FIG. 1, UE device 10 may include components located on or within an electronic device housing such as housing 12. Housing 12, which may sometimes be referred to as a case, may be formed of plastic, glass, ceramics, fiber composites, metal (e.g., stainless steel, aluminum, metal alloys, etc.), other suitable materials, or a combination of these materials. In some situations, part or all of housing 12 may be formed from dielectric or other low-conductivity material (e.g., glass, ceramic, plastic, sapphire, etc.). In other situations, housing 12 or at least some of the structures that make up housing 12 may be formed from metal elements.

UE device 10 may include control circuitry 14. Control circuitry 14 may include storage such as storage circuitry 16. Storage circuitry 16 may include hard disk drive storage, nonvolatile memory (e.g., flash memory or other electrically-programmable-read-only memory configured to form a solid-state drive), volatile memory (e.g., static or dynamic random-access-memory), etc. Storage circuitry 16 may include storage that is integrated within UE device 10 and/or removable storage media.

Control circuitry 14 may include processing circuitry such as processing circuitry 18. Processing circuitry 18 may be used to control the operation of UE device 10. Processing circuitry 18 may include on one or more processors, microprocessors, microcontrollers, digital signal processors, host processors, baseband processor integrated circuits, application specific integrated circuits, central processing units (CPUs), graphics processing units (GPUs), etc. Control circuitry 14 may be configured to perform operations in UE device 10 using hardware (e.g., dedicated hardware or circuitry), firmware, and/or software. Software code for performing operations in UE device 10 may be stored on storage circuitry 16 (e.g., storage circuitry 16 may include non-transitory (tangible) computer readable storage media that stores the software code). The software code may sometimes be referred to as program instructions, software, data, instructions, or code. Software code stored on storage circuitry 16 may be executed by processing circuitry 18.

Control circuitry 14 may be used to run software on UE device 10 such as satellite navigation applications, internet browsing applications, voice-over-internet-protocol (VOIP) telephone call applications, email applications, media playback applications, operating system functions, etc. To support interactions with external equipment, control circuitry 14 may be used in implementing communications protocols. Communications protocols that may be implemented using control circuitry 14 include internet protocols, wireless local area network (WLAN) protocols (e.g., IEEE 802.11 protocols—sometimes referred to as Wi-Fi®), protocols for other short-range wireless communications links such as the Bluetooth® protocol or other wireless personal area network (WPAN) protocols, IEEE 802.11ad protocols (e.g., ultra-wideband protocols), cellular telephone protocols (e.g., 3G protocols, 4G (LTE) protocols, 3GPP Fifth Generation (5G) New Radio (NR) protocols, Sixth Generation (6G) protocols, sub-THz protocols, THz protocols, etc.), antenna diversity protocols, satellite navigation system protocols (e.g., global positioning system (GPS) protocols, global navigation satellite system (GLONASS) protocols, etc.), antenna-based spatial ranging protocols, ultra-wideband protocols, optical communications protocols, or any other desired communications protocols. Each communications protocol may be associated with a corresponding radio access technology (RAT) that specifies the physical connection methodology used in implementing the protocol.

UE device 10 may include input-output circuitry 20. Input-output circuitry 20 may include input-output devices 22. Input-output devices 22 may be used to allow data to be supplied to UE device 10 and to allow data to be provided from UE device 10 to external devices. Input-output devices 22 may include user interface devices, data port devices, and other input-output components. For example, input-output devices 22 may include touch sensors, displays (e.g., touch-sensitive and/or force-sensitive displays), light-emitting components such as displays without touch sensor capabilities, buttons (mechanical, capacitive, optical, etc.), scrolling wheels, touch pads, key pads, keyboards, microphones, cameras, buttons, speakers, status indicators, audio jacks and other audio port components, digital data port devices, motion sensors (accelerometers, gyroscopes, and/or compasses that detect motion), capacitance sensors, proximity sensors, magnetic sensors, force sensors (e.g., force sensors coupled to a display to detect pressure applied to the display), temperature sensors, etc. In some configurations, keyboards, headphones, displays, pointing devices such as trackpads, mice, and joysticks, and other input-output devices may be coupled to UE device 10 using wired or wireless connections (e.g., some of input-output devices 22 may be peripherals that are coupled to a main processing unit or other portion of UE device 10 via a wired or wireless link).

Input-output circuitry 20 may include wireless circuitry 24 to support wireless communications. Wireless circuitry 24 (sometimes referred to herein as wireless communications circuitry 24) may include baseband circuitry such as baseband circuitry 26 (e.g., one or more baseband processors and/or other circuitry that operates at baseband), radio-frequency (RF) transceiver circuitry such as transceiver 28, and one or more antennas 30. If desired, wireless circuitry 24 may include multiple antennas 30 that are arranged into a phased antenna array (sometimes referred to as a phased array antenna) that conveys radio-frequency signals within a corresponding signal beam that can be steered in different directions. Baseband circuitry 26 may be coupled to transceiver 28 over one or more baseband data paths. Transceiver 28 may be coupled to antennas 30 over one or more radio-frequency transmission line paths 32. If desired, radio-frequency front end circuitry may be disposed on radio-frequency transmission line path(s) 32 between transceiver 28 and antennas 30.

In the example of FIG. 1, wireless circuitry 24 is illustrated as including only a single transceiver 28 and a single radio-frequency transmission line path 32 for the sake of clarity. In general, wireless circuitry 24 may include any desired number of transceivers 28, any desired number of radio-frequency transmission line paths 32, and any desired number of antennas 30. Each transceiver 28 may be coupled to one or more antennas 30 over respective radio-frequency transmission line paths 32. Radio-frequency transmission line path 32 may be coupled to antenna feeds on one or more antenna 30. Each antenna feed may, for example, include a positive antenna feed terminal and a ground antenna feed terminal. Radio-frequency transmission line path 32 may have a positive transmission line signal path that is coupled to the positive antenna feed terminal and may have a ground transmission line signal path that is coupled to the ground antenna feed terminal. This example is illustrative and, in general, antennas 30 may be fed using any desired antenna feeding scheme.

Radio-frequency transmission line path 32 may include transmission lines that are used to route radio-frequency antenna signals within UE device 10. Transmission lines in UE device 10 may include coaxial cables, microstrip transmission lines, stripline transmission lines, edge-coupled microstrip transmission lines, edge-coupled stripline transmission lines, transmission lines formed from combinations of transmission lines of these types, etc. Transmission lines in UE device 10 such as transmission lines in radio-frequency transmission line path 32 may be integrated into rigid and/or flexible printed circuit boards. In one embodiment, radio-frequency transmission line paths such as radio-frequency transmission line path 32 may also include transmission line conductors integrated within multilayer laminated structures (e.g., layers of a conductive material such as copper and a dielectric material such as a resin that are laminated together without intervening adhesive). The multilayer laminated structures may, if desired, be folded or bent in multiple dimensions (e.g., two or three dimensions) and may maintain a bent or folded shape after bending (e.g., the multilayer laminated structures may be folded into a particular three-dimensional shape to route around other device components and may be rigid enough to hold its shape after folding without being held in place by stiffeners or other structures). All of the multiple layers of the laminated structures may be batch laminated together (e.g., in a single pressing process) without adhesive (e.g., as opposed to performing multiple pressing processes to laminate multiple layers together with adhesive).

In performing wireless transmission, baseband circuitry 26 may provide baseband signals to transceiver 28 (e.g., baseband signals that include wireless data for transmission). Transceiver 28 may include circuitry for converting the baseband signals received from baseband circuitry 26 into corresponding radio-frequency signals (e.g., for modulating the wireless data onto one or more carriers for transmission, synthesizing a transmit signal, etc.). For example, transceiver 28 may include mixer circuitry for up-converting the baseband signals to radio frequencies prior to transmission over antennas 30. Transceiver 28 may also include digital to analog converter (DAC) and/or analog to digital converter (ADC) circuitry for converting signals between digital and analog domains. Transceiver 28 may transmit the radio-frequency signals over antennas 30 via radio-frequency transmission line path 32. Antennas 30 may transmit the radio-frequency signals to external wireless equipment by radiating the radio-frequency signals into free space.

In performing wireless reception, antennas 30 may receive radio-frequency signals from external equipment 34. The received radio-frequency signals may be conveyed to transceiver 28 via radio-frequency transmission line path 32. Transceiver 28 may include circuitry for converting the received radio-frequency signals into corresponding baseband signals. For example, transceiver 28 may include mixer circuitry for down-converting the received radio-frequency signals to baseband frequencies prior to conveying the baseband signals to baseband circuitry 26 and may include demodulation circuitry for demodulating wireless data from the received signals.

Front end circuitry disposed on radio-frequency transmission line path 32 may include radio-frequency front end components that operate on radio-frequency signals conveyed over radio-frequency transmission line path 32. If desired, the radio-frequency front end components may be formed within one or more radio-frequency front end modules (FEMs). Each FEM may include a common substrate such as a printed circuit board substrate for each of the radio-frequency front end components in the FEM. The radio-frequency front end components in the front end circuitry may include switching circuitry (e.g., one or more radio-frequency switches), radio-frequency filter circuitry (e.g., low pass filters, high pass filters, notch filters, band pass filters, multiplexing circuitry, duplexer circuitry, diplexer circuitry, triplexer circuitry, etc.), impedance matching circuitry (e.g., circuitry that helps to match the impedance of antennas 30 to the impedance of radio-frequency transmission line path 32), antenna tuning circuitry (e.g., networks of capacitors, resistors, inductors, and/or switches that adjust the frequency response of antennas 30), radio-frequency amplifier circuitry (e.g., power amplifier circuitry and/or low-noise amplifier circuitry), radio-frequency coupler circuitry, charge pump circuitry, power management circuitry, digital control and interface circuitry, and/or any other desired circuitry that operates on the radio-frequency signals transmitted and/or received by antennas 30.

While control circuitry 14 is shown separately from wireless circuitry 24 in the example of FIG. 1 for the sake of clarity, wireless circuitry 24 may include processing circuitry that forms a part of processing circuitry 18 and/or storage circuitry that forms a part of storage circuitry 16 of control circuitry 14 (e.g., portions of control circuitry 14 may be implemented on wireless circuitry 24). As an example, baseband circuitry 26 and/or portions of transceiver 28 (e.g., a host processor on transceiver 28) may form a part of control circuitry 14. Baseband circuitry 26 may, for example, access a communication protocol stack on control circuitry 14 (e.g., storage circuitry 16) to: perform user plane functions at a PHY layer, MAC layer, RLC layer, PDCP layer, SDAP layer, and/or PDU layer, and/or to perform control plane functions at the PHY layer, MAC layer, RLC layer, PDCP layer, RRC, layer, and/or non-access stratum layer.

The term "convey wireless signals" as used herein means the transmission and/or reception of the wireless (e.g., radio-frequency) signals (e.g., for performing unidirectional and/or bidirectional wireless communications with external wireless communications equipment). Antennas 30 may transmit the wireless signals by radiating the signals into free space (or to free space through intervening device structures such as a dielectric cover layer). Antennas 30 may additionally or alternatively receive the wireless signals from free space (e.g., through intervening devices structures such as a dielectric cover layer). The transmission and reception of wireless signals by antennas 30 each involve the excitation or resonance of antenna currents on an antenna resonating (radiating) element in the antenna by the wireless signals within the frequency band(s) of operation of the antenna.

Transceiver circuitry 26 may use antenna(s) 30 to transmit and/or receive wireless signals that convey wireless communications data between UE device 10 and AP 34. The wireless communications data may be conveyed bidirectionally or unidirectionally. The wireless communications data may, for example, include data that has been encoded into corresponding data packets such as wireless data associated with a telephone call, streaming media content, internet browsing, wireless data associated with software applications running on UE device 10, email messages, etc.

Additionally or alternatively, wireless circuitry 24 may use antenna(s) 30 to perform wireless (radio-frequency) sensing operations. The sensing operations may allow UE device 10 to detect (e.g., sense or identify) the presence, location, orientation, and/or velocity (motion) of objects external to UE device 10. Control circuitry 14 may use the detected presence, location, orientation, and/or velocity of the external objects to perform any desired device operations. As examples, control circuitry 14 may use the detected presence, location, orientation, and/or velocity of the external objects to identify a corresponding user input for one or more software applications running on UE device 10 such as a gesture input performed by the user's hand(s) or other body parts or performed by an external stylus, gaming controller, head-mounted device, or other peripheral devices or accessories, to determine when one or more antennas needs to be disabled or provided with a reduced maximum transmit power level (e.g., for satisfying regulatory limits on radio-frequency exposure), to determine how to steer (form) a radio-frequency signal beam produced by antennas 30 for wireless circuitry 24 (e.g., in scenarios where antennas 30 include a phased array of antennas 30), to map or model the environment around UE device 10 (e.g., to produce a software model of the room where UE device 10 is located for use by an augmented reality application, gaming application, map application, home design application, engineering application, etc.), to detect the presence of obstacles in the vicinity of (e.g., around) UE device 10 or in the direction of motion of the user of UE device 10, etc. The sensing operations may, for example, involve the transmission of sensing signals (e.g., radar waveforms), the receipt of corresponding reflected signals (e.g., the transmitted waveforms that have reflected off of external objects), and the processing of the transmitted signals and the received reflected signals (e.g., using a radar scheme).

Wireless circuitry 24 may transmit and/or receive wireless signals within corresponding frequency bands of the electromagnetic spectrum (sometimes referred to herein as communications bands or simply as "bands"). The frequency bands handled by wireless circuitry 24 may include wireless local area network (WLAN) frequency bands (e.g., Wi-Fi® (IEEE 802.11) or other WLAN communications bands) such as a 2.4 GHz WLAN band (e.g., from 2400 to 2480 MHz), a 5 GHz WLAN band (e.g., from 5180 to 5825 MHz), a Wi-Fi® 6E band (e.g., from 5925-7125 MHz), and/or other Wi-Fi® bands (e.g., from 1875-5160 MHz), wireless personal area network (WPAN) frequency bands such as the 2.4 GHz Bluetooth® band or other WPAN communications bands, cellular telephone frequency bands (e.g., bands from about 600 MHz to about 5 GHz, 3G bands, 4G LTE bands, 5G New Radio Frequency Range 1 (FR1) bands below 10 GHz, 5G New Radio Frequency Range 2 (ER2) bands between 20 and 60 GHz, 6G bands at sub-THz or THz frequencies greater than about 100 GHz, 100-1000 GHz, etc.), other centimeter or millimeter wave frequency bands between 10-100 GHz, near-field communications frequency bands (e.g., at 13.56 MHz), satellite navigation frequency bands (e.g., a GPS band from 1565 to 1610 MHz, a Global Navigation Satellite System (GLONASS) band, a BeiDou Navigation Satellite System (BDS) band, etc.), ultra-wideband (UWB) frequency bands that operate under the IEEE 802.15.4 protocol and/or other ultra-wideband communications protocols, communications bands under the family of 3GPP wireless communications standards, communications bands under the IEEE 802. XX family of standards, and/or any other desired frequency bands of interest.

Over time, software applications on electronic devices such as UE device 10 have become more and more data intensive. Wireless circuitry on the electronic devices therefore needs to support data transfer at higher and higher data rates. In general, the data rates supported by the wireless circuitry are proportional to the frequency of the wireless signals conveyed by the wireless circuitry (e.g., higher frequencies can support higher data rates than lower frequencies). Wireless circuitry 24 may convey centimeter and millimeter wave signals to support relatively high data rates (e.g., because centimeter and millimeter wave signals are at relatively high frequencies between around 10 GHz and 100 GHz). However, the data rates supported by centimeter and millimeter wave signals may still be insufficient to meet all the data transfer needs of UE device 10. To support even higher data rates such as data rates up to 5-100 Gbps or higher, wireless circuitry 24 may convey wireless signals at frequencies greater than about 100 GHz.

As shown in FIG. 1, wireless circuitry 24 may transmit wireless signals 46 to external equipment 34 and/or may receive wireless signals 46 from external equipment 34. Wireless signals 46 may be tremendously high frequency (THF) signals (e.g., sub-THz or THz signals) at frequencies greater than around 100 GHz (e.g., between 100 GHz and 1 THz, between 80 GHz and 10 THz, between 100 GHz and 10 THz, between 100 GHz and 2 THz, between 200 GHz and 1 THz, between 300 GHz and 1 THz, between 300 GHz and 2 THz, between 70 GHz and 2 THz, between 300 GHz and 10 THz, between 100 GHz and 800 GHz, between 200 GHz and 1.5 THz, or within any desired sub-THz, THz, THF, or sub-millimeter frequency band such as a 6G frequency band), may be millimeter (mm) or centimeter (cm) wave signals between 10 GHz and around 70 GHz (e.g., 5G NR 1-R2 signals), or may be signals at frequencies less than 10 GHz (e.g., 5G NR 1-R1 signals, LTE signals, 3G signals, 2G signals, WLAN signals, Bluetooth signals, UWB signals, etc.). If desired, the high data rates supported by THF signals may be leveraged by UE device 10 to perform cellular telephone voice and/or data communications (e.g., while supporting spatial multiplexing to provide further data bandwidth), to perform spatial ranging operations such as radar operations to detect the presence, location, and/or velocity of objects external to UE device 10, to perform automotive sensing (e.g., with enhanced security), to perform health/body monitoring on a user of UE device 10 or another person, to perform gas or chemical detection, to form a high data rate wireless connection between UE device 10 and another device or peripheral device (e.g., to form a high data rate connection between a display driver on UE device 10 and a display that displays ultra-high resolution video), to form a remote radio head (e.g., a flexible high data rate connection), to form a THF chip-to-chip connection within UE device 10 that supports high data rates (e.g., where one antenna 30 on a first chip in UE device 10 transmits wireless signals 46 to another antenna 30 on a second chip in UE device 10), and/or to perform any other desired high data rate operations.

In implementations where wireless circuitry 24 conveys THF signals, wireless circuitry may include electro-optical circuitry. The electro-optical circuitry may include light sources that generate first and second optical local oscillator (LO) signals. The first and second optical LO signals may be separated in frequency by the intended frequency of wireless signals 46. Wireless data may be modulated onto the first optical LO signal and one of the optical LO signals may be provided with an optical phase shift (e.g., to perform beamforming). The first and second optical LO signals may illuminate a photodiode that produces current at the frequency of wireless signals 46 when illuminated by the first and second optical LO signals. An antenna resonating element of a corresponding antenna 30 may convey the current produced by the photodiode and may radiate corresponding wireless signals 46. This is illustrative and, in general, wireless circuitry 24 may generate wireless signals 46 using any desired techniques.

Antennas 30 may be formed using any desired antenna structures. For example, antennas 30 may include antennas with resonating elements that are formed from loop antenna structures, patch antenna structures, inverted-F antenna structures, slot antenna structures, planar inverted-F antenna structures, helical antenna structures, monopole antennas, dipoles (e.g., planar dipole antennas such as bowtie antennas), hybrids of these designs, etc. Parasitic elements may be included in antennas 30 to adjust antenna performance.

If desired, two or more of antennas 30 may be integrated into a phased antenna array (sometimes referred to herein as a phased array antenna or an array of antenna elements). Each antenna 30 in the phased antenna array forms a respective antenna element of the phased antenna array. Each antenna 30 in the phased antenna array has a respective phase and magnitude controller that imparts the radio-frequency signals conveyed by that antenna with a respective phase and magnitude. The respective phases and magnitudes may be selected (e.g., by control circuitry 14) to configure the radio-frequency signals conveyed by the antennas 30 in the phased antenna array to constructively and destructively interfere in such a way that the radio-frequency signals collectively form a signal beam (e.g., a signal beam of wireless signals 46) oriented in a corresponding beam pointing direction (e.g., a direction of peak gain). The signal beams of wireless signals 46 formed by phased arrays of antennas 30 may sometimes be referred to herein as UE beams or UE signal beams. The control circuitry may adjust the phases and magnitudes to change (steer) the orientation of the signal beam (e.g., the beam pointing direction) to point in other directions over time. This process may sometimes also be referred to herein as beamforming. Beamforming may boost the gain of wireless signals 46 to help overcome over-the-air attenuation and the signal beam may be steered over time to point towards AP 34 even as the position and orientation of UE device 10 changes.

As shown in FIG. 1, AP 34 may also include control circuitry 36 (e.g., control circuitry having similar components and/or functionality as control circuitry 14 in UE device 10) and wireless circuitry 38 (e.g., wireless circuitry having similar components and/or functionality as wireless circuitry 24 in UE device 10). Wireless circuitry 38 may include baseband circuitry 40 and transceiver 42 (e.g., transceiver circuitry having similar components and/or functionality as transceiver circuitry 28 in UE device 10) coupled to two or more antennas 44 (e.g., antennas having similar components and/or functionality as antennas 30 in UE device 10). Antennas 44 may be arranged in one or more phased antenna arrays (e.g., phased antenna arrays that perform beamforming similar to phased antenna arrays of antennas 30 on UE device 10). AP 34 may use wireless circuitry 38 to transmit a signal beam of wireless signals 46 to UE device 10 (e.g., as downlink (DL) signals transmitted in a downlink direction) and/or to receive a signal beam of wireless signals 46 transmitted by UE device 10 (e.g., as uplink (UL) signals transmitted in an uplink direction). The signal beams of wireless signals 46 formed by phased arrays of antennas 44 may sometimes be referred to herein as AP beams or AP signal beams.

Each AP beam may be defined by a set of beamforming coefficients, settings, phases, and/or magnitudes for each of the antennas or antenna elements in the phased array of antennas 44. AP 34 may include or store a codebook that stores the sets of beamforming coefficients, settings, phases, and/or magnitudes for generating each of the AP beams. The codebook may include codebook indices for each AP beam and may, if desired, include information identifying the orientation of the corresponding AP beam relative to AP 34. Similarly, each UE beam may be defined by a set of beamforming coefficients, settings, phases, and/or magnitudes for each of the antennas or antenna elements in the phased array of antennas 30. UE device 10 may include or store a codebook that stores the sets of beamforming coefficients, settings, phases, and/or magnitudes for generating each of the UE beams The codebook may include codebook indices for each UE beam and may, if desired, include information identifying the orientation of the corresponding UE beam relative to UE device 10.

While communications at high frequencies allow for extremely high data rates (e.g., greater than 100 Gbps), wireless signals 46 at such high frequencies are subject to significant attenuation during propagation over-the-air. Integrating antennas 30 and 44 into phased antenna arrays helps to counteract this attenuation by boosting the gain of the signals within a signal beam. However, signal beams are highly directive and may require a line-of-sight (LOS) between UE device 10 and external equipment 34. If an external object is present between AP 34 and UE device 10, the external object may block the LOS between UE device 10 and AP 34, which can disrupt wireless communications using wireless signals 46. If desired, system 8 may include a reflective device that allows UE device 10 and external equipment 34 to continue to communicate using wireless signals 46 even when an external object blocks the LOS between UE device 10 and AP 34 (or whenever direct over-the-air communications between AP 34 and UE device 10 otherwise exhibits less than optimal performance).

As shown in FIG. 1, system 8 may include one or more reflective devices such as reflective device 50. Reflective device 50 may sometimes also be referred to as a reflective surface, a radio-frequency reflective device, a reflector device, or a radio-frequency reflector device. AP 34 may be separated from UE device 10 by a line-of-sight (LOS) path. In some circumstances, an external object such as object 51 may block the LOS path. Object 51 may be, for example, part of a building such as a wall, window, floor, or ceiling (e.g., when UE device 10 is located inside), furniture, a body or body part, an animal, a cubicle wall, a vehicle, a landscape feature, or other obstacles or objects that may block the LOS path between AP 34 and UE device 10.

In the absence of external object 51, AP 34 may form a corresponding AP beam of wireless signals 46 oriented in the direction of UE device 10 and UE device 10 may form a corresponding UE beam of wireless signals 46 oriented in the direction of external equipment 34. UE device 10 and AP 34 can then convey wireless signals 46 over their respective signal beams and the LOS path. However, the presence of external object 51 prevents wireless signals 46 from being conveyed over the LOS path.

Reflective device 50 may be placed or disposed within system 8 in such a way so as to allow reflective device 50 to reflect wireless signals 46 between UE device 10 and AP 34 despite the presence of external object 51 within the LOS path. More generally, reflective device 50 may be used to reflect wireless signals 46 between UE device 10 and AP 34 when reflection via reflective device 50 offers superior radio-frequency propagation conditions relative to the LOS path regardless of the presence of external object 51 (e.g., when the LOS path between AP 34 and reflective device 50 and the LOS path between reflective device 50 and UE device 10 exhibit superior propagation/channel conditions than the direct LOS path between UE device 10 and AP 34). When reflective device 50 is placed within system 8, AP 34 may transmit downlink wireless signals 46 towards reflective device 50 (e.g., within an AP beam oriented towards reflective device 50 rather than towards UE device 10) and reflective device 50 may reflect the wireless signals (the AP beam) towards UE device 10, as shown by arrow 54. Conversely, UE device 10 may transmit uplink wireless signals 46 towards reflective device 50 (e.g., within a UE beam oriented towards reflective device 50 rather than towards AP 34) and reflective device 50 may reflect the wireless signals (the UE beam) towards AP 34, as shown by arrow 56.

Reflective device 50 may include a set of one or more reflectors 48. Reflective device 50 may be powered or may be unpowered. In implementations where reflective device 50 is powered, reflective device 50 may include control circuitry such as control circuitry 52 and may, if desired, include one or more antennas such as antenna 58. Control circuitry 52 may include processing circuitry (e.g., one or more processors) and/or storage circuitry. Control circuitry 52 may control one or more operations of reflective device 50.

In some implementations when reflective device 50 is powered, reflective device 50 may include antenna elements arranged in one or more arrays (e.g., phased arrays of antenna elements). The antenna elements may be formed using any desired antenna structures. For example, the antenna elements may include loop antenna structures, patch antenna structures, inverted-F antenna structures, slot antenna structures, planar inverted-F antenna structures, helical antenna structures, monopole antennas, dipoles (e.g., planar dipole antennas such as bowtie antennas), hybrids of these designs, etc. The control circuitry may control the operation of the array of antenna elements. In these implementations, when electro-magnetic (EM) energy waves (e.g., waves of wireless signals 46) are incident on reflective device 50, the wave is effectively reflected by each antenna element in the array (e.g., via re-radiation by each antenna element with a respective phase and amplitude response). The control circuitry may program the response of the antenna elements to set and change the scattering, absorption, reflection, and diffraction properties of the entire reflective device over time to change the direction of reflected wave to point in different desired directions. The reflective device may sometimes be referred to as a reconfigurable intelligent surface (RIS) or intelligent reflective surface (IRS) in these implementations.

Implementing reflective device 50 as a RIS can be very difficult and can consume an excessive amount of time and power. For example, time and power is required to calculate and set phase shifts for all of the antenna elements, complicated beam finding and tracking procedures may be required for static and dynamic environments, and it can be difficult to adapt to situations in which the same reflective device serves multiple UE devices. The RIS may require tens of thousands of independently controlled antenna elements and tens of thousands of beams to sweep over an initialization or tracking procedures, and the corresponding phase shifters may utilize expensive PIN diodes and/or varactor diodes. The phase shifts often also introduce amplitude reduction to the impinging wave, which further reduces the efficiency of the reflective device. This may make the calculation of the overall reflection and thus the different phase shifts even more complicated. It would therefore be desirable for reflective device 50 to be able to reflect wireless signals 46 between AP 34 and UE device 10 without implementing reflective device 50 as a RIS (e.g., without using actively adjusted antenna elements and phase shifters to reflect radio-frequency signals).

To mitigate these issues, reflective device 50 may use passive (unpowered) reflectors such as reflectors 48 to reflect wireless signals 46 between AP 34 and UE device 10. Reflectors 48 may include radio-frequency reflectors (e.g., radio-frequency mirrors) rather than antenna elements. A set of reflectors 48 may be arranged in an array or in another pattern on reflective device 50. Each reflector 48 may include a tile (e.g., a planar tile) of radio-frequency reflective material such as metal or other materials that exhibit reflectivity greater than a threshold reflectivity at the frequencies of wireless signals 46. Each reflector 48 may span a corresponding surface area and may be oriented in a different respective direction. Each reflector 48 may therefore reflect incident radio-frequency signals from a respective range of incidence angles onto a respective range of reflected (output) angles (e.g., within a corresponding field-of-view (FOV) of the reflector). The reflectors 48 across the set (array) may be disposed at different orientations/angles to configure the reflectors 48 across reflective device 50 to collectively allow for the reflection of wireless signals 46 from a wide range of incidence angles onto a wide range of reflected (output) angles (e.g., within a corresponding FOV of reflective device 50).

If each reflector 48 is sufficiently large, AP 34 may have a different AP beam that points towards each respective reflector 48 in reflective device 50. Similarly, UE device 10 may have a different UE beam that points towards each respective reflector 48 in reflective device 50. By illuminating different reflectors 48 on reflective device 50 with wireless signals 46, AP 34 and UE device 10 may direct the wireless signals (via reflection off reflective device 50) in different directions (e.g., to cover different locations across an entire room or area despite the presence of external object 51 in the LOS path). On the other hand, reducing the size of reflectors 48 may help to focus the wireless signals within a particular spot beam while minimizing the size of reflective device 50.

Consider an example in which reflectors 48 are configured to span a reflection range (FOV) of 90 degrees. Assuming an angular resolution of 4 degrees, reflective device 50 may cover the FOV with an array of 22-by-22 reflectors 48. Because reflectors 48 are passive, un-powered, non-radiative, and are not configured to re-radiate incident radio-frequency signals with different phases and magnitudes, implementing reflective device 50 with reflectors 48 may be significantly less expensive, may consume significantly less power, and may involve significantly less operating overhead than a RIS having antenna elements that reflect incident radio-frequency signals.

In implementations where reflective device 50 is unpowered, the orientation of reflectors 48 may be set and/or calibrated (e.g., manually by hand, using tools, using set-up equipment, etc.) during installation of reflective device 50 in system 8 to cover the desired FOV. In implementations where reflective device 50 is unpowered and in implementations where reflective device is powered, reflectors 48 may be fixed in place with corresponding orientations upon installation in system 8. In these implementations, AP 34 and UE device 10 may transmit wireless signals 46 to a desired location simply by changing which reflector 48 is illuminated by the corresponding signal beam.

In implementations where reflective device 50 is powered, one or more reflectors 48 may be dynamically and electrically (e.g., electro-mechanically) adjustable/configurable. For example, the electrically adjustable reflectors 48 may include electromechanical actuators (e.g., piezoelectric actuators or shifters, micro-electromechanical systems (MEMS) structures, motors, etc.) that rotate or change the orientation/angle of the reflectors based on control signals provided by control circuitry 52. In these implementations, AP 34 and UE device 10 may transmit wireless signals 46 to a desired location by changing which reflector 48 is illuminated by the corresponding signal beam and/or via electromechanical rotation of reflectors 48. In general, powered implementations for reflective device 50 may consume more power than unpowered implementations for reflective device 50 but may offer more dynamic adaptability for covering a desired area with reflected radio-frequency signals. Implementations in which reflectors 48 are fixed (e.g., fixed in place with corresponding fixed orientations/angles) may consume less power and/or involve less control and resource overhead than implementations in which reflectors 48 are electrically adjustable.

In implementations where reflective device 50 is powered, control circuitry 52 may use antenna(s) 58 to communicate with AP 34 and/or UE device 10 using radio-frequency signals 59. Radio-frequency signals 59 may be conveyed using a different RAT than wireless signals 46 if desired (e.g., using a control RAT). AP 34 and/or UE device 10 may transmit control signals (e.g., control commands) to reflective device 50 in radio-frequency signals 59. The control signals may be used to control, set, change, and/or rotate the orientation/angle of one or more of the adjustable reflectors 48 on reflective device 50. For example, AP 34 or UE device 10 may transmit a control signal to reflective device 50 in radio-frequency signals 59 that instructs control circuitry 52 to adjust or rotate one or more of reflectors 48 by a given angle. Such rotations may be performed while establishing and/or maintaining communications between AP 34 and UE device 10 via reflective device 50 (e.g., while setting up an initial configuration for reflective device 50 and/or for tracking UE device 10 as the UE device moves after communications have already been established).

Figure 2:
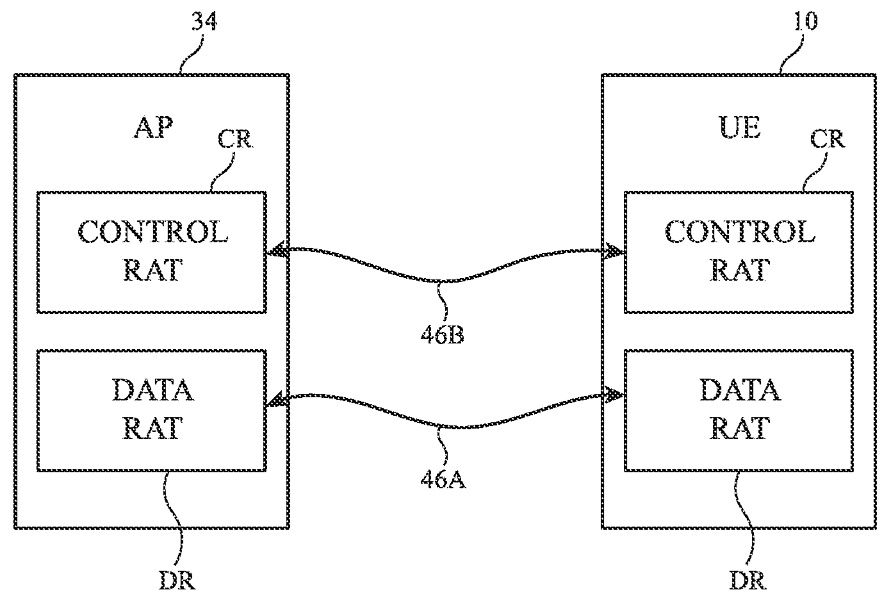
FIG. 2 is a diagram showing how an illustrative AP and UE device may communicate using both a data transfer radio access technology (RAT) and a control RAT in accordance with some embodiments.

AP 34 and UE device 10 may communicate using multiple RATs. FIG. 2 is a diagram showing how AP 34 and UE device 10 may communicate using both a control RAT and a data transfer RAT for establishing and maintaining communications between AP 34 and UE device 10 via reflective device 50. As shown in FIG. 2, AP 34 and UE device 10 may each include wireless circuitry that operates according to a data transfer RAT DR (sometimes referred to herein as data RAT DR) and a control RAT CR. Data RAT DR may be a sub-THz communications RAT such as a 6G RAT, a cm/mm wave RAT such as a 5G NR FR2 RAT, and/or any other RAT that is used to convey wireless signals 46 via reflection off reflective device 50 (FIG. 1).

Control RAT CR may be associated with wireless communications that consume much fewer resources and are less expensive to implement than the communications of data RAT DR. For example, control RAT CR may be Wi-Fi, Bluetooth, a cellular telephone RAT such as a 3G, 4G, or 5G NR FR1 RAT, etc. As another example control RAT CR may be an infrared communications RAT (e.g., where an infrared remote control or infrared emitters and sensors use infrared light to convey signals for the control RAT between UE device 10 and AP 34).

UE device 10 and AP 34 may use control RAT CR to convey radio-frequency signals SIGB (e.g., control signals) between UE device 10 and AP 34. UE device 10 and AP 34 may use data RAT DR to convey wireless signals SIGA via reflection off reflective device 50 (e.g., as shown by arrows 54 and 56 of FIG. 1). UE device 10 and/or AP 34 may also use control RAT CR to communicate with antenna(s) 58 on reflective device 50 (FIG. 1). AP 34 and/or UE device 10 may use radio-frequency signals SIGB and control RAT CR to calibrate reflectors 48 on reflective device 50 and/or to establish/maintain communications between AP 34 and UE device 10 (via reflection off reflective device 50) using data RAT DR. AP 34 and UE device 10 may also use data RAT DR to convey wireless signals SIGA within uninterrupted signal beams (e.g., direct signal beams that do not reflect off reflective device 50) when a LOS path between UE device 10 and AP 34 is available. Control RAT CR may not require a LOS path between AP 34 and UE device 10 (e.g., because the control RAT is associated with radio-frequency signals at much lower frequencies than data RAT DR). The control RAT is therefore particularly suitable for establishing and maintaining communications using the data RAT via reflective device 50 when AP 34 does not have a LOS path to UE device 10.

Figure 3:
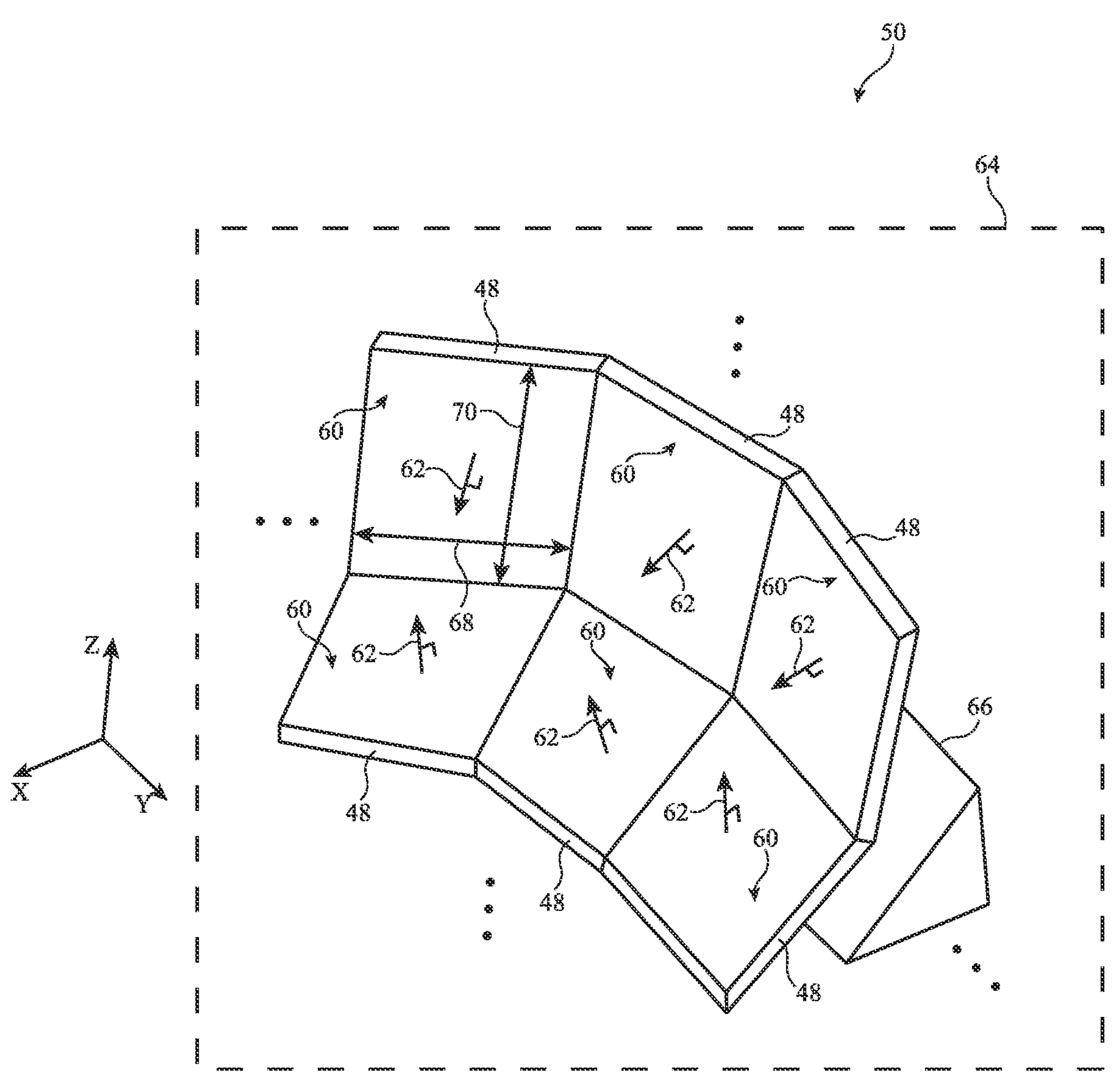
FIG. 3 is a perspective view of an illustrative reflective device in accordance with some embodiments.

FIG. 3 is a perspective front view of reflective device 50. As shown in FIG. 3, reflective device may include a set of reflectors 48 (e.g., reflective panels, sheets, or tiles). Each reflector 48 has a corresponding lateral reflective surface 60. Each reflective surface 60 has a corresponding normal axis 62 oriented perpendicular to the reflective surface. Reflectors 48 may be placed, disposed, or oriented in a set of angles/orientations. For example, reflectors 48 may be oriented such that the normal axis 62 of each reflector 48 points in a different respective direction (e.g., is oriented at a different respective angle with respect to the X-Y-Z axes of FIG. 3). This may configure reflective device 50 to exhibit a curved shape (e.g., that is curved around one or more axes). Normal axes 62 of reflectors 48 may, for example, be oriented at non-zero angles with respect to the X, Y, and/or Z axes of FIG. 3 (or any other angles in any other coordinate system). Normal axes 62 may also form the reflective axes of reflectors 48. For example, each reflector 48 will reflect radio-frequency signals incident at a given incident angle onto a corresponding output (reflected) angle that is equal to the incident angle as measured with respect to the reflector's normal axis 62 but on the opposing side of the normal axis (e.g., normal axis 62 may bisect the incident and output angles).

Each reflector 48 may thereby be configured to reflect radio-frequency signals from a different respective range of incident angles onto a different respective range of output (reflected) angles (e.g., within a respective FOV of the reflector). The ranges of incident angles may point towards AP 34, for example. The ranges of output angles may point towards different locations in system 8 where a UE device 10 may be present. Reflective device 50 may include any desired number of reflectors 48 (e.g., one reflector 48, two reflectors 48, three reflectors 48, four reflectors 48, 4-16 reflectors 48, more than 16 reflectors 48, more than 32 reflectors 48, more than 64 reflectors 48, more than 128 reflectors 48, etc.). The number, size, and/or orientations of reflectors 48 across reflective device 50 may be selected to collectively provide coverage across a sufficiently large FOV (e.g., a 90 degree FOV). AP 34 may transmit radio-frequency signals to a particular location in the FOV of reflective device 50 by directing its AP beam onto the reflector 48 of reflective device 50 having a range of output angles that point towards that location. AP 34 may change the location over time by changing its AP beam and thus the reflector 48 that is illuminated with radio-frequency signals transmitted by AP 34.

In the example of FIG. 3, each reflector 48 is a rectangular panel (tile) having a length 68 and a perpendicular width 70. If desired, reflectors 48 may be square panels (e.g., where length 68 equals width 70). Reflectors 48 may have other shapes having any desired number of straight and/or curved edges. The dimensions of reflectors 48 may be sufficiently large to allow each reflector to be illuminated by a different respective AP beam of AP 34 but sufficiently small so as to provide sufficient focusing for the radio-frequency signals while also minimizing the size of reflective device 50. Length 68 and/or width 70 (or the maximum lateral dimension of reflector 48 in implementations where reflector 48 is non-rectangular) may, for example, be greater than ten times the wavelength of the radio-frequency signals reflected by reflective device 50 (e.g., wireless signals 46 of FIG. 1). Reflectors 48 may be planar or may, in other implementations, be curved (e.g., spherically curved, parabolically curved, freeform curved, etc.).

The reflectors 48 in reflective device 50 may be mounted to support structures 66 (sometimes referred to herein simply as support 66). Support structures 66 may couple reflectors 48 to an underlying structure while allowing reflectors 48 to remain in their corresponding relative orientations/angles. In implementations where reflectors 48 are electrically adjustable, electromechanical actuators may couple reflectors 48 to support structures 66. The electromechanical actuators may be electrically controlled to adjust the orientation/angle of reflectors 48 with respect to support structures 66. Support structures 66 may, if desired, include mounting structures (e.g., adhesive, brackets, a frame, screws, pins, clips, etc.) that can be used to affix or attach reflective device 50 to the underlying structure. The underlying structure may be another electronic device, a wall, the ceiling, the floor, furniture, etc. Disposing reflective device 50 on a ceiling, wall, window, column, pillar, or at or adjacent to the corner of a room (e.g., a corner where two walls intersect, where a wall intersects with the floor or ceiling, where two walls and the floor intersect, or where two walls and the ceiling intersect), as examples, may be particularly helpful in allowing reflective device 50 to reflect wireless signals between AP 34 and UE device 10 around various objects 51 that may be present (e.g., when AP 34 is located outside and UE device 10 is located inside, when AP 34 and UE device 10 are both located inside or outside, etc.). If desired, reflectors 48 and/or support structures 66 may be enclosed within a housing 64. The housing may be formed from materials that are transparent to wireless signals 46.

Figure 4:
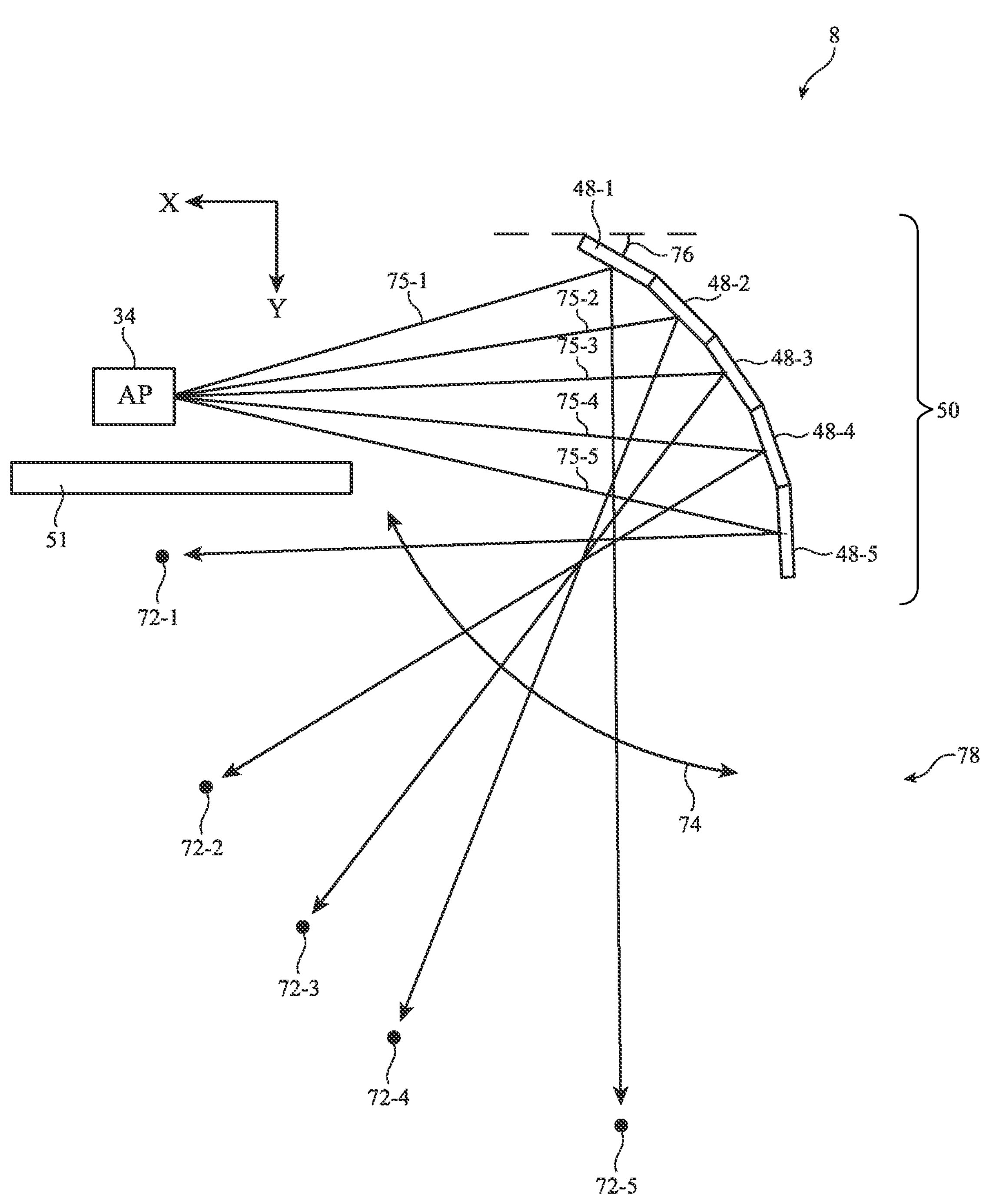
FIG. 4 is a top view showing how an illustrative AP may transmit radio-frequency signals to different locations via reflection off different reflectors of a reflective device in accordance with some embodiments.

FIG. 4 is a top view showing one example of how reflective device 50 may be used to convey wireless signals 46 between AP 34 and different locations in area (region) 78 of system 8. Area 78 may not have a LOS path to AP 34 (e.g., due to the presence of external object 51). In the example of FIG. 4, reflective device 50 includes at least five reflectors 48 such as reflectors 48-1, 48-2, 48-3, 48-4, and 48-5. Reflectors 48-1 through 48-5 may be fixed reflectors or may be electrically adjustable reflectors. The example of FIG. 4 shows a cross-section of reflective device 50 and, in general, reflective device 50 may include additional reflectors 48 above and/or below reflectors 48-1 through 48-5 (e.g., into and out of the plane of the page).

In the implementation of FIG. 4, the reflectors are oriented in a curved configuration in which each reflector is oriented at a greater angle than the previous reflector with respect to a given axis. For example, as shown in FIG. 4, reflector 48-1 is oriented at a first angle 76 with respect to a given axis (e.g., an axis parallel to the X-axis of FIG. 4). The first angle 76 may be, for example, 45 degrees. Reflector 48-1 may be oriented at a second angle with respect to the axis that is larger than the first angle, reflector 48-3 may be oriented at a third angle with respect to the axis that is larger than the second angle, reflector 48-4 may be oriented at a fourth angle with respect to the axis that is larger than the third angle, and reflector 48-5 may be oriented at a fifth angle with respect to the axis that is larger than the fourth angle (e.g., 90 degrees). This may configure reflective device 50 to collectively exhibit a FOV 74 of 90 degrees (e.g., extending between the X and Y axes of FIG. 4).

AP 34 may transmit wireless signals 46 (FIG. 1) to different locations 72 in system 8 by transmitting the wireless signals 46 using different AP beams 75 pointed towards different respective reflectors 48. For example, AP 34 may have a first AP beam 75-1 that points towards (overlaps) reflector 48-1, may have a second AP beam 75-2 that points towards (overlaps) reflector 48-2, may have a third AP beam 75-3 that points towards (overlaps) reflector 48-3, may have a fourth AP beam 75-4 that points towards (overlaps) reflector 48-4, and may have a fifth AP beam 75-5 that points towards (overlaps) reflector 48-5. In general, AP 34 may have an AP beam 75 that points towards each reflector 48 in reflective device 50. The lateral dimensions of each reflector 48 may be sufficiently large so that each AP beam 75 illuminates only a respective one of reflectors 48 at the distance of reflective device 50 from AP 34, for example.

Reflector 48-1 may reflect AP beam 75-1 towards location 72-5 in system 8. Reflector 48-2 may reflect AP beam 75-2 towards location 72-4 in system 8. Reflector 48-3 may reflect AP beam 75-3 towards location 72-3 in system 8. Reflector 48-4 may reflect AP beam 75-4 towards location 72-2 in system 8. Reflector 48-5 may reflect AP beam 75-5 towards location 72-1 in system 8. When a UE device 10 is present at location 72-5, AP 34 may thereby transmit wireless signals 46 to the UE device by transmitting wireless signals 46 towards reflector 48-1 within AP beam 75-1. Similarly, when a UE device 10 is present at location 72-4, AP 34 may transmit wireless signals 46 to the UE device by transmitting wireless signals 46 to reflector 48-2 within AP beam 75-2. When a UE device 10 is present at location 72-3, AP 34 may transmit wireless signals 46 to the UE device by transmitting wireless signals 46 to reflector 48-3 within AP beam 75-3. When a UE device 10 is present at location 72-2, AP 34 may transmit wireless signals 46 to the UE device by transmitting wireless signals 46 to reflector 48-4 within AP beam 75-4. When a UE device 10 is present at location 72-1, AP 34 may transmit wireless signals 46 to the UE device by transmitting wireless signals 46 to reflector 48-5 within AP beam 75-5. AP 34 may change the AP beam 75 used to illuminate reflective device 50 (and thus the reflector 48 that reflects wireless signals 46) as needed based on the location of the UE device within area 78 of system 8 (e.g., to continue to transmit wireless signals 46 to the UE device even if the UE device moves over time).

If desired, multiple UE devices 10 may be present in system 8 at once (e.g., in a multi-user scenario). For example, a first UE device may be at location 72-1 whereas a second UE device is at location 72-5. In these situations, AP 34 may transmit wireless signals 46 to the first UE device by illuminating reflector 48-5 using AP beam 75-5 and may transmit wireless signals 46 to the second UE device by illuminating reflector 48-1 using AP beam 75-1. AP 34 may concurrently transmit wireless signals 46 to both the first and second UE devices by concurrently illuminating reflector 48-1 using AP beam 75-1 and reflector 48-5 using AP beam 75-5 (e.g., in implementations where the phased antenna array(s) on AP 34 support transmission over concurrent AP beams using a spatial multiplexing scheme).

If desired, AP 34 may transmit wireless signals 46 to the first and second UE devices using a time division multiplexing scheme in which AP 34 illuminates reflectors 48-1 and 48-5 during alternating time periods. If desired, AP 34 may transmit wireless signals to different UE devices at the same location 72 using a frequency division multiplexing scheme in which AP 34 illuminates the same reflector 48 with wireless signals 46 of different frequencies (e.g., where each frequency conveys a wireless data stream for a respective one of the UE devices). Any desired combination of spatial, time, and frequency division multiplexing schemes may be used to concurrently or sequentially transmit wireless signals 46 to any desired number of UE devices 10 at one or more locations 72 in system 8. When reflective device 50 has a sufficient number of reflectors 48, an entirety of area 78 of system 8 may be provided with radio-frequency coverage via reflection off reflective device 50.

While the example of FIG. 4 illustrates downlink transmission of wireless signals 46 from AP 34 to UE device(s) 10 via reflective device 50 for the sake of simplicity, reflective device 50 may conversely reflect wireless signals 46 during uplink transmission of wireless signals 46 from UE device(s) 10 to AP 34. The UE device may, for example, transmit the wireless signals within a UE beam oriented towards the corresponding reflector 48 on reflective device 50 that reflects wireless signals incident from the direction of the UE device towards AP 34.

AP 34 may calibrate the distance and orientation of reflectors 48 on reflective device 50 prior to establishing communications with UE device 10 via reflective device 50. This calibration may allow AP 34 to know which reflectors 48 to illuminate to transmit wireless signals 46 to different specific locations 72 in area 78 of system 8. In implementations where reflectors 48 are fixed reflectors, this calibration may be performed once (e.g., upon installation of reflective device 50 in system 8).

Figure 5:
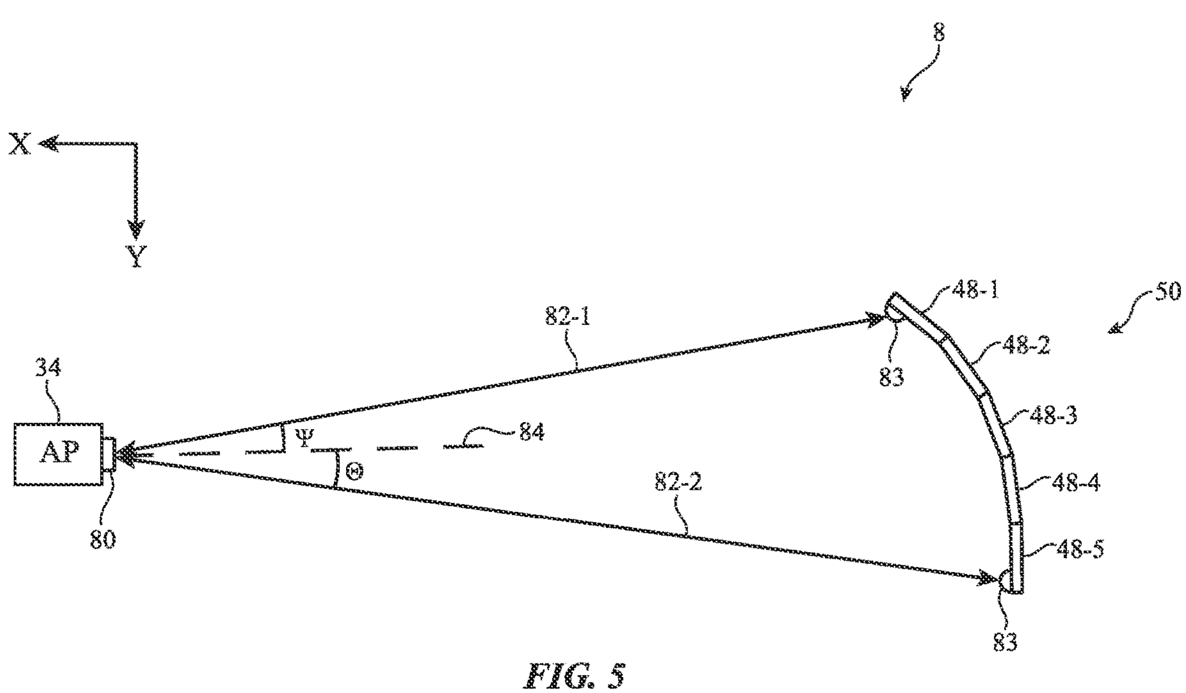
FIG. 5 is a top view showing how an illustrative AP may calibrate the position/orientation of a reflective device using optical signals and optical reflectors in accordance with some embodiments.

FIG. 5 is a diagram showing one example in which AP 34 calibrates reflective device 50 using optical signals. As shown in FIG. 5, AP 34 may include optical equipment 80. Optical equipment 80 may include a set of optical emitters (e.g., one or more lasers) and a corresponding set of optical sensors (e.g., one or more optical sensors. Optical equipment 80 may additionally or alternatively be separate from AP 34 such as optical equipment used by an administrator, user, or technician for AP 34 (e.g., the optical emitters may include laser pointers).

The optical emitter(s) may emit optical signals 82 (e.g., laser light) towards different locations on reflective device 50. Reflective device 50 may include two or more calibration points (e.g., three calibration points) 83. Each calibration point 83 may be located on a different reflector 48 of reflective device 50. Calibration points 83 may include optical reflectors (e.g., laser reflection bubbles) that reflect the incident optical signals 82 back towards their respective emitter (e.g., back towards the optical sensor(s) in optical equipment 34). For example, a first calibration point 83 may be mounted to reflector 48-1 whereas a second calibration point 83 is mounted to reflector 48-5. Optical equipment 80 may transmit optical signals 82-1 towards the calibration point 83 on reflector 48-1 and may transmit optical signals 82-2 towards the calibration point 83 on reflector 48-5. The calibration point 83 on reflector 48-1 may reflect optical signals 82-1 back towards optical equipment 80. The calibration point 83 on reflector 48-5 may reflect optical signals 82-2 back towards optical equipment 80. Optical equipment 80 may include a single optical emitter to identify a three-dimensional location of reflective device 50. Optical equipment 80 may include multiple optical emitters (e.g., three optical emitters that emit optical signals 82 towards respective calibration points 83) to identify the three-dimensional location of reflective device as well as its orientation (e.g., to identify the position of reflective device 50 in six dimensions or degrees of freedom).

AP 34 may process the transmitted and/or received optical signals to detect (e.g., characterize, determine, compute, measure, etc.) the distance between AP 34 and the corresponding calibration point 83. By measuring this distance across multiple points on reflective device 50 (e.g., across each of calibration points 83), AP 34 may detect (e.g., calculate, measure, computer, sense, etc.) the distance and/or orientation of one or more reflectors 48 and thus reflective device 50 itself with respect to AP 34. For example, AP 34 may characterize the orientation and position of reflective device 50 using a first angle ψ with respect to axis 84 and a second angle θ with respect to axis 84, for example. Once AP 34 knows the distance between AP 34 and reflective device 50 and/or the distance to or orientation of one or more reflectors 48, AP 34 may form suitable AP beams that are pointed towards different reflectors 48 on reflective device 50.

Figure 6:
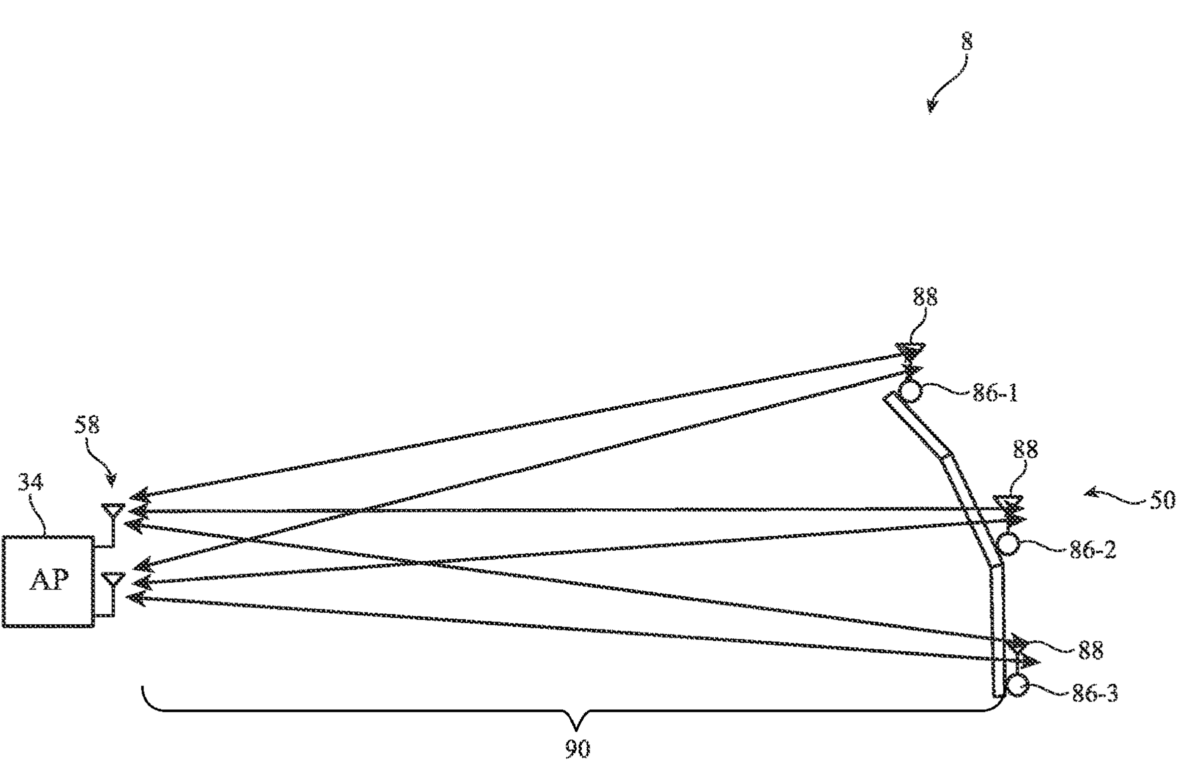
FIG. 6 is a top view showing how an illustrative AP may calibrate the position/orientation of a reflective device using ultra-wideband signals in accordance with some embodiments.

The example of FIG. 5 is illustrative and non-limiting. If desired, ultra-wideband (UWB) signals may be used to calibrate the position/orientation of reflective device 50 with respect to AP 34, as shown in the example of FIG. 6. As shown in FIG. 6, AP 34 may include at least two antennas 58 (e.g., UWB antennas). Reflective device 50 may include at least three UWB antennas 88. Each UWB antenna 88 may be mounted to a respective reflector 48 on reflective device 50. If desired, each UWB antenna 88 may be integrated into a wireless (UWB) tag such as tags 86 (e.g., a first tag 86-1, a second tag 86-2, a third tag 86-3, etc.). Each tag 86 may be mounted to a respective reflector 48. In other implementations, a user may place a single tag 86 or another electronic device with a UWB antenna at different locations on reflective device 50 (e.g., on different reflectors 48) at different times during calibration.

UWB signals 90 may be conveyed between antennas 58 on AP 34 and UWB antennas 88 on reflective device 50 for detecting (calibrating) the position/orientation of reflective device 50 with respect to AP 34. UWB antennas 88 and/or antennas 58 may transmit and/or receive UWB signals 90 according to an ultra-wideband (UWB) protocol such as the IEEE 802.15.4 protocol and/or other ultra-wideband communications protocols. UWB signals 90 may be based on an impulse radio signaling scheme that uses band-limited data pulses. UWB signals 90 may have any desired bandwidths such as bandwidths between 499 MHz and 1331 MHz, bandwidths greater than 500 MHz, etc. The presence of lower frequencies in the baseband may sometimes allow UWB signals to penetrate through objects such as walls. In an IEEE 802.15.4 system, a pair of electronic devices such as AP 34 and reflective device 50 may exchange wireless time stamped messages. Time stamps in the messages may be analyzed to determine the time of flight of the messages and thereby determine the distance (range) between the devices and/or an angle between the devices (e.g., an angle of arrival of incoming radio-frequency signals). UWB signals 90 may be conveyed in UWB frequency bands such as an ultra-wideband communications band between about 5 GHz and about 8.5 GHz (e.g., a 6.5 GHz UWB communications band, an 8 GHz UWB communications band, and/or at other suitable frequencies).

As shown in FIG. 6, a first antenna 58 may use UWB signals 90 transmitted by each of the first, second, and third UWB antennas 88 on reflective device 50 to detect the range between AP 34 and the first, second, and third UWB antennas 88, respectively, and thus the ranges between AP 34 and each of the reflectors 48 coupled to the first, second, and third UWB antennas. If desired, AP 34 may include three or more antennas 58 that convey UWB signals. By measuring this distance across multiple points on reflective device 50 (e.g., the location of each UWB antenna 88), AP 34 may detect (e.g., calculate, measure, computer, sense, etc.) the distance and/or orientation of one or more reflectors 48 and thus reflective device 50 itself with respect to AP 34. Once AP 34 knows the distance between AP 34 and reflective device 50 and/or the distance to or orientation of one or more reflectors 48, AP 34 may form suitable AP beams that are pointed towards different reflectors 48 on reflective device 50. Calibration using UWB signals (as shown in FIG. 6) may, for example, be triggered and performed autonomously by AP 34 (whereas calibration using optical signals as shown in FIG. 5 may be triggered by a user). Other frequencies or RATs may be used to calibrate reflective device 50 using radio-frequency signals if desired.

Figure 7:
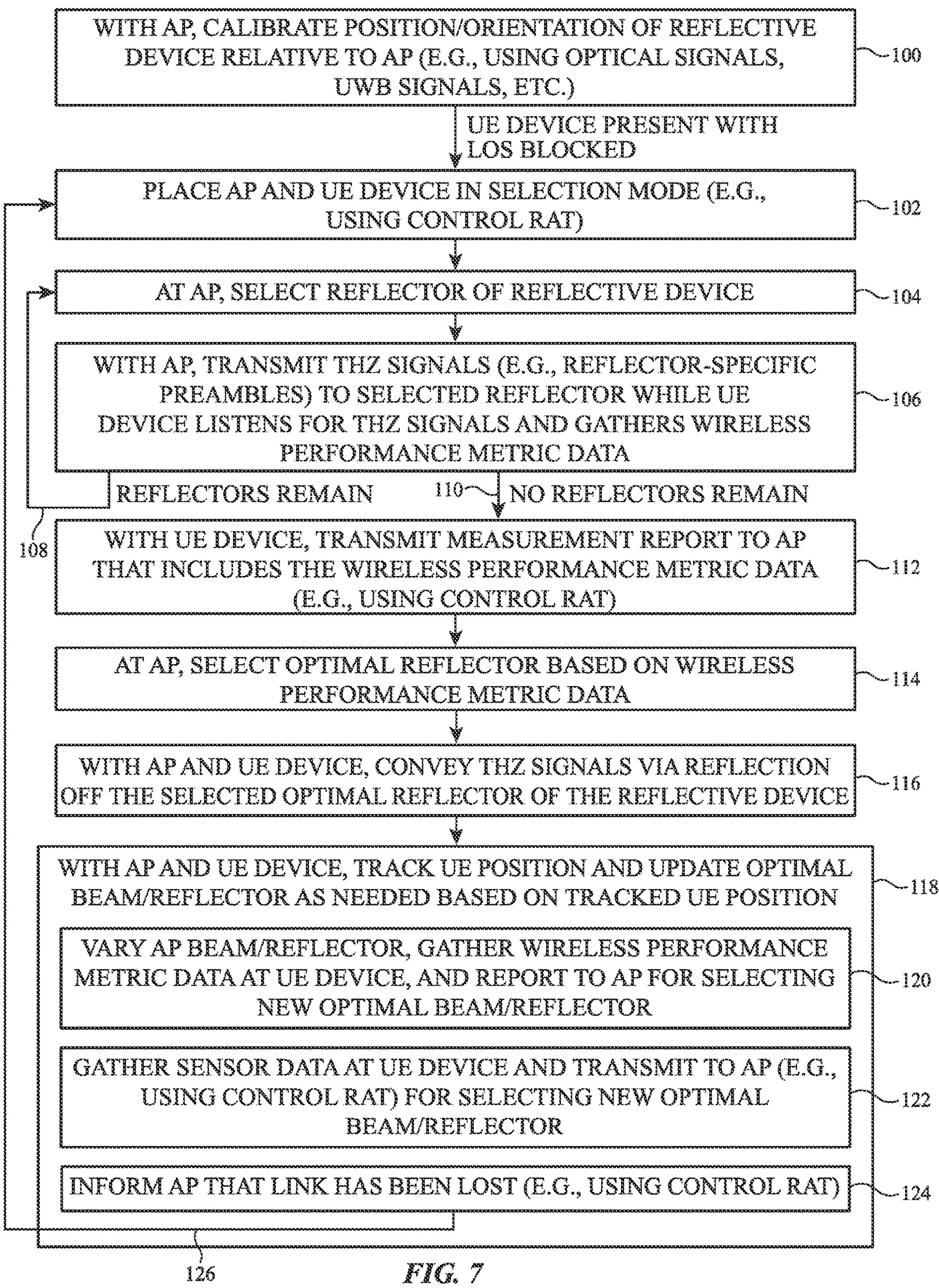
FIG. 7 is a flow chart of illustrative operations involved in establishing and maintaining wireless communications between an AP and a UE device via reflection of radio-frequency signals off a reflective device in accordance with some embodiments.

FIG. 7 is a flow chart of illustrative operations involved in establishing and maintaining wireless communications between an AP 34 and UE device 10 via reflection of wireless signals 46 off reflective device 50. The operations of FIG. 7 may be performed after AP 34 and reflective device 50 have been installed in system 8 (e.g., after reflectors 48 have been placed in an initial set of orientations/angles to configure reflective device 50 to exhibit a sufficient FOV over area 78 of system 8).

At operation 100, AP 34 may calibrate the position, distance to, and/or orientation of one or more reflectors 48 and/or of reflective device 50 with respect to AP 34. AP 34 may, for example, detect, measure, sense, or calculate the position, distance to, and/or orientation of one or more reflectors 48 and/or of reflective device 50 with respect to AP 34 using optical signals (FIG. 5), using UWB signals (FIG. 6), or using other techniques. AP 34 may identify AP beams based on the detected position, distance to, and/or orientation of one or more reflectors 48 and/or of reflective device 50 with respect to AP 34. For example, AP 34 may identify AP beams that point towards each reflector 48 in reflective device 50 based on the detected position, distance to, and/or orientation of one or more reflectors 48 and/or of reflective device 50 with respect to AP 34.

Following the initial calibration, AP 34 may monitor system 8 for the presence of a UE device 10 that wishes to communicate with AP 34 using data RAT DR. When a UE device 10 enters system 8 and a LOS path is present between the UE device and AP 34, AP 34 and UE device 10 may convey wireless signals 46 over the data RAT and the LOS path. When the LOS path is blocked or otherwise offers inferior radio-frequency propagation to communication via reflective device 50, AP 34 may choose to communicate with UE device 10 via reflective device 50 (e.g., by illuminating a reflector 48 on reflective device 50 that reflects wireless signals 46 between the current position of the UE device and AP 34). AP 34 may select the particular reflector 48 on reflective device 50 to use by beam steering over different AP beams. Thus, the reflector selection speed is limited only by the antenna tuning duration at the AP, which is generally very rapid and is much faster than reconfiguring the many antenna elements on a RIS in implementations where reflective device 50 is a RIS.

Processing may advance to operation 102 when the LOS path is blocked between UE device 10 and AP 34 or otherwise offers inferior radio-frequency propagation to communication via reflective device 50. At operation 102, AP 34 and UE device 10 may be placed into a selection mode. For example, UE device 10 may use control RAT CR to inform AP 34 that it wishes to begin or continue communicating using data RAT DR and may subsequently begin to listen for wireless signals 46 transmitted by AP 34 using data RAT DR. Additionally or alternatively, AP 34 may use control RAT CR to inform UE device 10 that it is about to begin or continue transmitting wireless signals 46. UE device may subsequently begin to listen for wireless signals 46 transmitted by AP 34. UE device 10 may listen for wireless signals 46 by actively receiving radio-frequency energy using the data RAT and one or more antennas, attempting to decode wireless signals or data in the received radio-frequency energy, gathering wireless performance metric data from the received radio-frequency energy, comparing the wireless performance metric data to one or more threshold values, etc. The wireless performance metric data may include received power values, signal strength values, received signal strength indicator values, signal-to-noise ratio values, noise floor values, error rate values, signal quality values, decoded data, and/or any other desired values that characterize the satisfactory reception of wireless signals 46 at UE device 10.

At operation 104, AP 34 may select one of the reflectors 48 on reflective device 50. AP 34 may have knowledge of the different reflectors 48 on reflective device 50, their respective orientations/positions, and/or the AP beams that are oriented towards each of the reflectors from the calibration performed at operation 100.

At operation 106, AP 34 may transmit wireless signals 46 (e.g., sub-THz signals, MM/CM wave signals, etc.) towards the selected reflector 48. AP 34 may, for example, transmit wireless signals 46 within the AP beam 75 (FIG. 4) that is oriented/pointed towards (e.g., overlaps) the selected reflector (e.g., at the known (calibrated) distance/orientation of the selected reflector with respect to AP 34). AP 34 may include a very short pre-amble within the transmitted wireless signals 46. The pre-amble may be specific/unique to the particular selected reflector 48 and AP beam 75 (e.g., the preamble may be a reflector-specific preamble). UE device 10 may concurrently listen for the wireless signals 46 transmitted by AP 34. UE device 10 may sweep over different UE beams while listening for the wireless signals 46 if desired (e.g., during each iteration of operation 106). While listening for wireless signals 46, UE device may gather wireless performance metric data indicative of whether UE device 10 received the transmitted wireless signals 46 that reflected off the selected reflector 48.

If reflectors 48 remain in reflective device 50 for testing, processing may loop back to operation 104 via path 108 and AP 34 may select a subsequent reflector 48 in reflective device 50 to reflect wireless signals 46. AP 34 may transmit a different respective preamble in the wireless signals 46 to each selected reflector 48 and UE device 10 may continue to listen for wireless signals 46 while gathering wireless performance metric data. This is illustrative and, in other implementations, AP 34 may transmit the same preamble or another signal to each selected reflector 48. AP 34 may continue to sweep/scan over different reflectors 48 in reflective device 50 until no reflectors 48 remain in reflective device 50, at which point processing may proceed to operation 112 via path 110.

At operation 112, UE device 10 may transmit a measurement report or other feedback (control) signals to AP 34 (e.g., the measurement report may be a type of feedback signal structured as a measurement report). The measurement report or other feedback signals may include the wireless performance metric data gathered while AP 34 swept over AP beams 75 and reflectors 48. The wireless performance metric data in the measurement report or other feedback signals may include information identifying any preamble (or the preamble itself) that was successfully received (e.g., successfully decoded) at UE device 10 during the sweep/scan over AP beams 75 and reflectors 48. Since each transmitted preamble is specific to a corresponding one of reflectors 48 (e.g., was reflected by a corresponding one of reflectors 48), the information identifying the preamble may help AP 34 to determine which reflector 48 successfully reflected wireless signals 46 towards the current location of UE device 10. UE device 10 may, for example, use control RAT CR to transmit the measurement report to AP 34. If desired, UE device 10 may transmit feedback signals to AP 34 using the data RAT instead of over the control RAT. There may be, for example a frame structure where AP 34 periodically transmits a reference signal (e.g., an identical or indistinguishable preamble) and at some point after the preamble transmission, AP 34 may listen for a response from UE device 10 (e.g., similar to a random access channel (RACH) process). Once the UE device hears/receives the preamble reflected off reflective device 50, the UE device has knowledge of the successful UE beam setting and it can respond in the RACH time slot corresponding to the received preamble.

At operation 114, AP 34 may select an optimal reflector 48 and a corresponding optimal AP beam 75 (e.g., the AP beam pointed towards the optimal reflector) based on the wireless performance metric data in the measurement report. AP 34 may, for example, select the reflector 48 corresponding to the preamble identified in the measurement report as the optimal reflector. If desired, AP 34 may select the optimal reflector 48 by comparing other wireless performance metric data gathered by UE device 10 and included in the measurement report to one or more threshold values (e.g., where the optimal reflector reflected wireless signals from which UE device 10 gathered wireless performance metric data that exceeded the one or more threshold values). If desired, AP 34 may use control RAT CR to inform UE device 10 of the selected optimal reflector 48 and/or AP beam 75.

If desired, UE device 10 may select an optimal UE beam to use based on the wireless performance metric data gathered while iterating through operation 106. For example, UE device 10 may select the UE beam that was active when UE device 10 was able to successfully receive or decode a preamble in wireless signals 46 as the optimal UE beam. The optimal UE beam may, for example, be oriented/pointed towards the optimal reflector 48 on reflective device 50. If desired, UE device 10 may use control RAT CR to inform AP 34 of the selected optimal UE beam. Additionally or alternatively, UE device 10 may select an optimal UE beam based on information received from AP 34 (e.g., over the control RAT) identifying the selected reflector and/or AP beam.

At operation 116, AP 34 and UE device 10 may convey wireless signals 46 via reflection off the selected optimal reflector 48 (e.g., using data RAT DR, sub-THz frequencies, MM/CM wave frequencies, etc.). AP 34 may transmit and receive wireless signals 46 within the selected optimal AP beam, which may be oriented/pointed towards (e.g., overlapping) the selected optimal reflector 48. UE device 10 may transmit and receive wireless signals 46 within the selected optimal UE beam, which may be oriented/pointed towards (e.g., overlapping) the selected optimal reflector 48. In this way, AP 34 and UE device 10 may convey wireless data (using wireless signals 46) at extremely high data rates despite the lack of an LOS path between AP 34 and UE device 10.

At operation 118, AP 34 and/or UE device 10 may track the position of UE device 10 over time. AP 34 may update the selected optimal reflector 48 (and its corresponding AP beam 75) over time based on the tracked position of UE device 10. The updated optimal reflector 48 may, for example, be a reflector 48 that reflects wireless signals 46 between AP 34 and a new (updated) position of UE device 10 even if UE device 10 has moved over time. Similarly, UE device 10 may update its selected optimal UE beam over time based on its tracked position. This may allow wireless signals 46 to continue to be conveyed between AP 34 and UE device 10 via reflection off reflective device 50 even as UE device 10 moves over time.

AP 34 and UE device 10 may track UE device 10 in any desired manner using data RAT DR and/or control RAT CR. For example, AP 34 may vary its active AP beam 75 and thus the active reflector 48 used to reflect wireless signals 46 (at operation 120). AP 34 may, for example, illuminate different reflectors 48 around the selected optimal reflector 48 to check whether a different reflector will perform better in communicating with UE device 10. UE device 10 may gather wireless performance metric data while AP 34 varies the active AP beam. UE device 10 may transmit the wireless performance metric data and/or any preambles that were decoded while AP 34 varied the active AP beam to AP 34 over the control RAT (e.g., within a measurement report). If the wireless performance metric data indicates that one of the other reflectors 48 reflects wireless signals with improved radio-frequency performance at UE device 10, then AP 34 may select that reflector as a new (updated) optimal reflector 48 and may continue to communicate with UE device 10 using the new (updated) optimal reflector 48 (and the corresponding AP beam).

AP 34 may perform operation 120 periodically or in response to any desired trigger condition. For example, AP 34 may perform operation 120 when AP 34 gathers wireless performance metric data from wireless signals 46 transmitted by UE device 10 that fall below a threshold value, when UE device 10 requests that AP 34 perform operation 120 over control RAT CR (e.g., when UE device 10 gathers wireless performance metric data from wireless signals 46 transmitted by UE device 10 that fall below a threshold value), etc. The AP beam variation of operation 120 may be performed relatively quickly such that only a limited amount of communication time is blocked by attempting to find an updated optimal reflector. Communication disruption may be further limited by limiting the variation of the active AP beam to only a subset of the total AP beams (e.g., by sweeping over a subset of reflectors 48 such as only the reflectors 48 adjacent to the currently active reflector 48 and AP beam 75).

Additionally or alternatively, UE device 10 may gather sensor data (at operation 122). The sensor data may be indicative of movement and/or rotation of UE device 10. The sensor data may include, for example, position sensor data, satellite navigation system data (e.g., GPS data), accelerometer data, gyroscope data, inertial measurement unit data, compass data, light sensor data, wireless performance metric data, etc. When the sensor data indicates that UE device 10 has moved or rotated by an amount that exceeds a threshold value (e.g., by an amount such that the UE device is likely to have moved out of the coverage area of the currently-selected AP beam 75 as reflected off the currently-selected reflector 48), UE device 10 may transmit information to AP 34 (e.g., using control RAT CR) that includes the gathered sensor data and/or that otherwise identifies the amount of movement or rotation of UE device 10 that has occurred. AP 34 may process this information to select a new (updated) optimal reflector 48 and corresponding AP beam 75 (e.g., AP 34 may select a new optimal reflector 48 and AP beam 75 based on the sensor data gathered by UE device 10). The new (updated) optimal reflector 48 may be the reflector that reflects wireless signals 46 to the new current position of UE device 10 as identified by the sensor data, for example.

If desired, AP 34 may scan or sweep over signal beams based on the sensor data received from UE device 10. For example, UE device 10 moving or rotating by an amount exceeding a threshold value may form the trigger condition with which AP 34 performs operation 120 (e.g., UE device 10 may request that AP device 34 perform operation 120 when UE device 10 has detected that it has moved or rotated). As another example, when the sensor data includes wireless performance metric data gathered by UE device 10, the wireless performance metric data (e.g., received signal strength values) falling below a threshold value may form the trigger condition with which AP 34 performs operation 120 (e.g., UE device 10 may request that AP device 34 perform operation 120 when UE device 10 has detected that its received signal level has dropped by an excessive amount).

When the wireless link between UE device 10 and AP 34 (via data RAT DR) has been lost, UE device 10 may inform AP 34 that the link has been lost (at operation 124). UE device 10 may detect that the wireless link has been lost when the wireless performance metric data gathered by UE device 10 has fallen below a threshold value, when UE device 10 is no longer receiving wireless signals 46 transmitted by AP 34, etc. UE device 10 may use control RAT CR to inform AP 34 that the wireless link has been lost. Additionally or alternatively, AP 34 may detect that the wireless link has been lost (e.g., when the wireless performance metric data gathered by AP 34 has fallen below a threshold value, when AP 34 is no longer receiving wireless signals 46 transmitted by UE device 10, etc.). When the wireless link has been lost, processing may loop back to operation 102 via path 126 to perform a full sweep over AP beams and reflectors 48 on reflective device 50 until the wireless link with UE device 10 is re-acquired.

The example of FIG. 7 is illustrative and non-limiting. If the LOS path between AP 34 and UE device 10 returns, AP 34 may reconfigure its antennas to use an AP beam that points towards UE device and UE device 10 may reconfigure its antennas to use a UE beam that points towards AP 34. If desired, UE device 10 may transmit measurement reports to AP 34 after each iteration of operation 106 rather than waiting until AP 34 has finished sweeping over all reflectors 48 on reflective device 50. The operations described herein as being performed by AP 34 may alternatively be performed by UE device 10 whereas the operations described herein as being performed by UE device 10 may be performed by AP 34 (e.g., the UE device may control establishment of data RAT communications with AP 34 via reflective device 50).

Figure 8:
FIG. 8 is a front view of an illustrative reflective device showing how an AP may scan a signal beam across different reflectors while establishing communications with a UE device in accordance with some embodiments.
Figure 8:
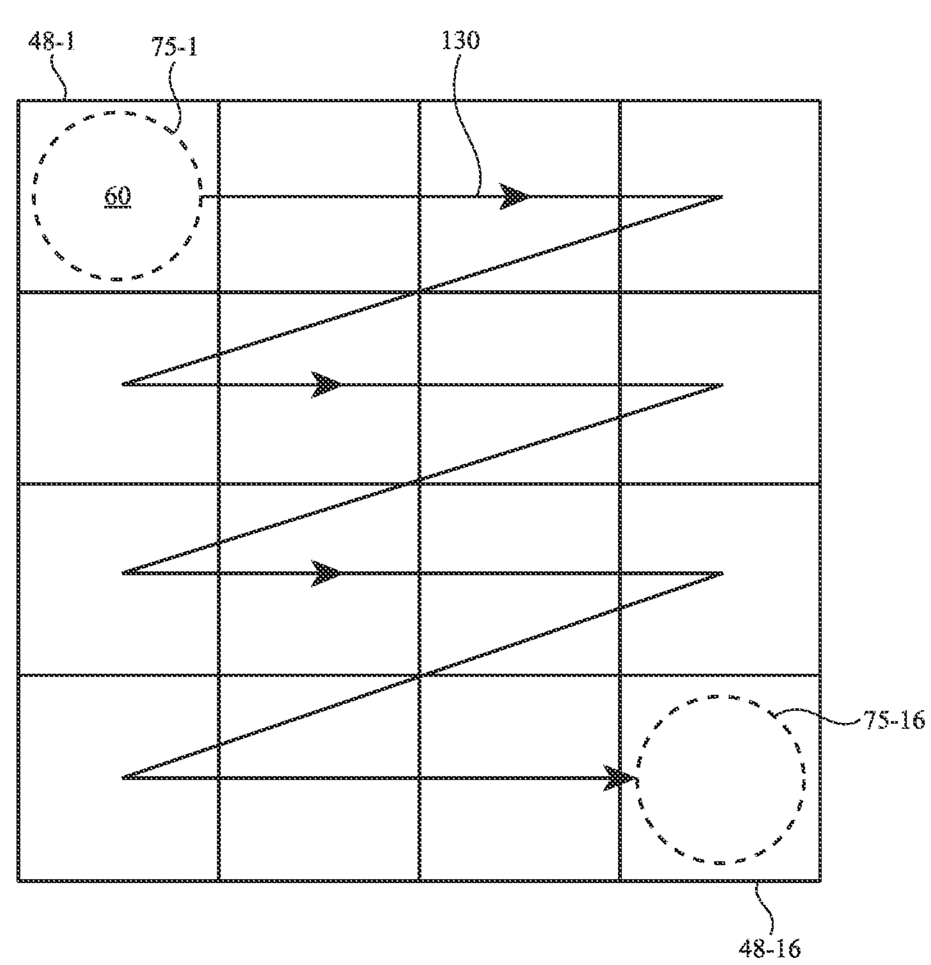

FIG. 8 is a front view of reflective device 50 showing one example of how AP 34 may sweep/scan over different AP beams 75 and reflectors 48 while establishing data RAT communications with UE device 10 via reflective device 50 (e.g., while iterating through operation 106 of FIG. 7). AP 34 may sweep through AP beams 75 and corresponding reflectors 48 in any desired pattern. In the example of FIG. 8, AP 34 sweeps through reflectors 48 and AP beams 75 from a first AP beam 75-1 overlapping a first reflector 48-1 to a sixteenth AP beam 75-16 overlapping a sixteenth reflector 48-16 in a raster scan pattern, as shown by arrow 130. AP 34 may transmit a respective preamble or repetitions of the respective preamble to each reflector 48 (e.g., using the corresponding AP beam 75) and each reflector 48 may reflect its preamble(s) in a different respective direction.

In the raster scan pattern of FIG. 8, each reflector 48 in a given row is used to reflect a respective reflector-specific preamble in wireless signals 46 in order from left to right and then each subsequent row is similarly scanned until all reflectors 48 have reflected the corresponding reflector-specific preambles in wireless signals 46. This example is illustrative and non-limiting. AP 34 may sweep through reflectors 48 in any other desired orders/patterns. Reflective device 50 includes sixteen reflectors 48 arranged in four rows and columns in this example. In general, reflective device 50 may include any desired number of reflectors 48 arranged in any desired number of rows, any desired number of columns, and/or in any other desired pattern.

Figure 9:
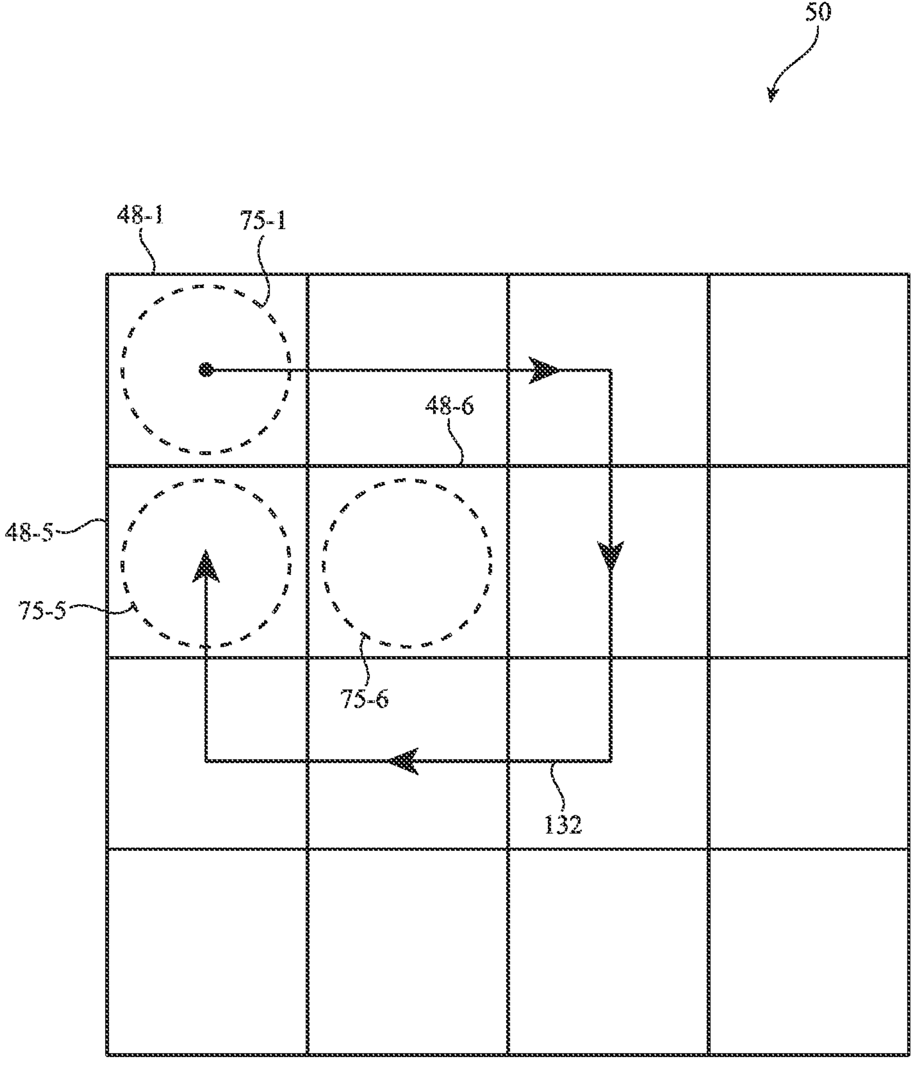
FIG. 9 is a front view of an illustrative reflective device showing how an AP may scan a signal beam across different reflectors while tracking a UE device in accordance with some embodiments.

FIG. 9 is a front view of reflective device 50 showing one example of how AP 34 may vary its active AP beam 75 and the active reflector 48 while tracking UE device 10 (e.g., while performing operation 120 of FIG. 7). As shown in FIG. 9, AP 34 may convey wireless signals 46 within selected optimal AP beam 75-6 overlapping a selected optimal reflector 48-6 (e.g., as selected while processing operation 114 of FIG. 7). In response to a trigger condition, AP 34 may vary its active AP beam 75 and thus the active reflector 48 around selected optimal AP beam 75-6.

AP 34 may vary the active AP beam and the active reflector by scanning/sweeping through AP beams 75 adjacent to the selected optimal AP beam 75-6 and thus scanning/sweeping through reflectors 48 adjacent to selected optimal reflector 48-6. For example, AP 34 may begin to transmit wireless signals 46 within AP beam 75-1 overlapping reflector 48-1. AP 34 may then sweep through the AP beams and reflectors 48 around selected optimal AP beam 75-6 and selected optimal reflector 48-6 to AP beam 48-5 overlapping reflector 48-5, as shown by arrow 132. UE device 10 may gather wireless performance metric data during this sweep and may transmit a measurement report identifying the wireless performance metric data to AP 34 (e.g., over the control RAT).

UE device 10 and/or AP 34 may process the wireless performance metric data to identify whether one of the swept AP beams and reflectors offers superior wireless performance in communicating with UE device 10 than selected optimal AP beam 75-6 and selected optimal reflector 48-6. For example, if UE device 10 has moved from its initial position, AP beam 75-5 and reflector 48-5 may offer better wireless performance than selected optimal AP beam 75-6 and selected optimal reflector 48-6 (e.g., because UE device 10 may have moved to a location in area 78 of system 8 that overlaps the AP beam 75-5 as reflected by reflector 48-5 and has moved away from the location in area 78 that overlaps the AP beam 75-6 as reflected by reflector 48-6). Since it is unlikely that UE device 10 has moved far from its initial position within the time scale of UE tracking, sweeping over AP beams and reflectors around the current selected optimal AP beam and reflector may be highly likely to maintain communications with UE device 10. By limiting the sweep over AP beams and reflectors to a subset of all of the available AP beams and reflectors (e.g., to the AP beams and reflectors adjacent to or around selected optimal AP beam and selected optimal reflector 48-6), UE tracking may be performed relatively quickly without significant disruptions to wireless data transfer between UE device 10 and AP 34.

This example is illustrative and non-limiting. AP 34 may sweep through reflectors 48 in any other desired orders/patterns while processing operation 120 of FIG. 7. Reflective device 50 includes sixteen reflectors 48 arranged in four rows and columns in this example. In general, reflective device 50 may include any desired number of reflectors 48 arranged in any desired number of rows, any desired number of columns, and/or in any other desired pattern.

Figure 10:
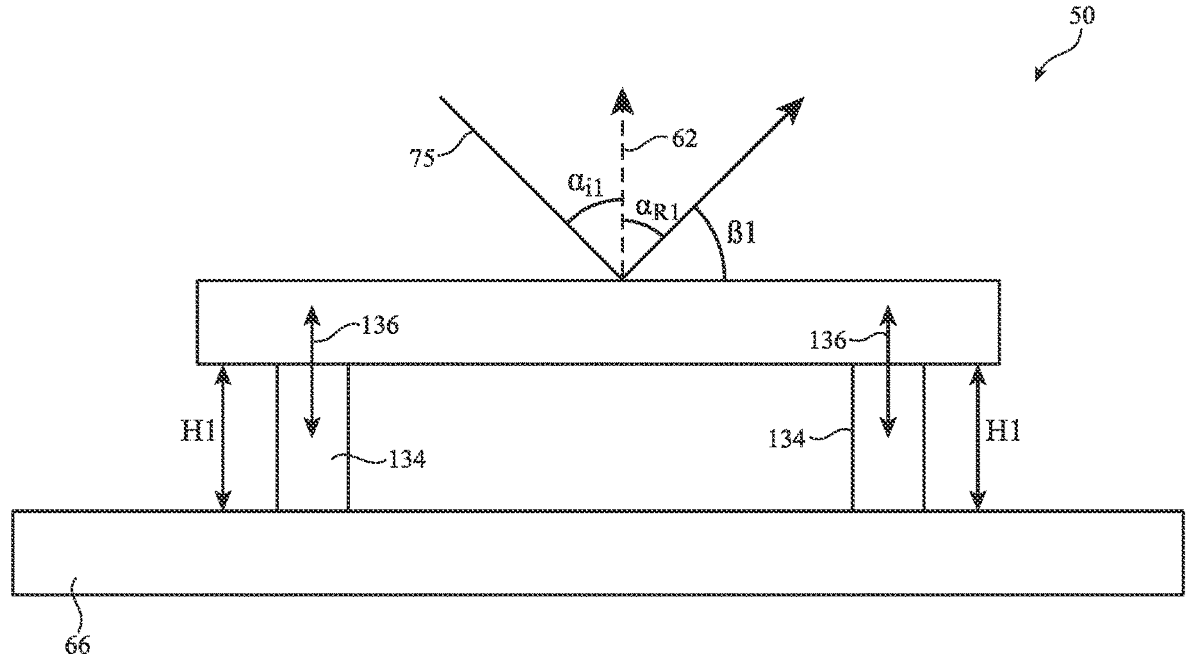
FIG. 10 is a side view of an illustrative adjustable reflector in a reflective device in accordance with some embodiments.

If desired, one or more reflectors 48 on reflective device 50 may be electrically adjustable. FIG. is a side view of an electrically adjustable reflector 48. As shown in FIG. 10, reflective device 50 may include one or more electromechanical actuators 134 (sometimes referred to herein simply as actuators 134) that couple reflector 48 to support structures 66 (e.g., reflector 48 may be mounted to support structures 66 using one or more electromechanical actuators 134, may be coupled to support structures 66 by or through one or more electromechanical actuators 134, etc.). Electromechanical actuators 134 may include piezoelectric actuators or shifters, micro-electromechanical systems (MEMS) structures, motors, etc.

Electromechanical actuators 134 may receive electrical control signals from control circuitry 52 (FIG. 1) that control electromechanical actuators 134 to mechanically move or rotate some or all of reflector 48. Electromechanical actuator(s) 134 may rotate, raise, lower, tilt, or otherwise adjust the position and/or orientation (angle) of reflector 48 with respect to support structures 66. For example, electromechanical actuator(s) 134 may raise or lower a first (e.g., left) side (edge) of reflector 48 to change the distance of the first side of reflector 48 from support structures 66 and/or may raise or lower a second (e.g., right) side (edge) of reflector 48 opposite the first side of reflector 48 to change the distance of the second side of reflector 48 from support structures 66, as shown by arrows 136. Electromechanical actuator(s) 134 may raise or lower additional edges of reflector 48 to tilt reflector 48 in three dimensions if desired.

In the example of FIG. 10, reflector 48 has a non-tilted orientation in which the left side and the right side of reflector 48 are both located at distance H1 from support structures 66 and in which the reflective surface of reflector 48 lies within a plane parallel to the horizontal axis of FIG. 10. An incident AP beam 75 may reflect off reflector 48 about normal axis 62 of reflector 48. AP beam 75 may be incident on reflector 48 at incident angle $\alpha_{i1}$ with respect to normal axis 62. Reflector 48 may reflect signal beam 75 at output (reflected) angle $\alpha_{R1}$ with respect to normal axis 62 (e.g., on the side of normal axis 62 opposite to incident angle $\alpha_{i1}$). Reflector 48 may act as a radio-frequency mirror such that the magnitude of incident angle $\alpha_{i1}$ is equal to the magnitude of output angle $\alpha_{R1}$. This may serve to reflect AP beam 75 in a direction given by angle β1 with respect to the horizontal axis of FIG. 10.

Figure 11:
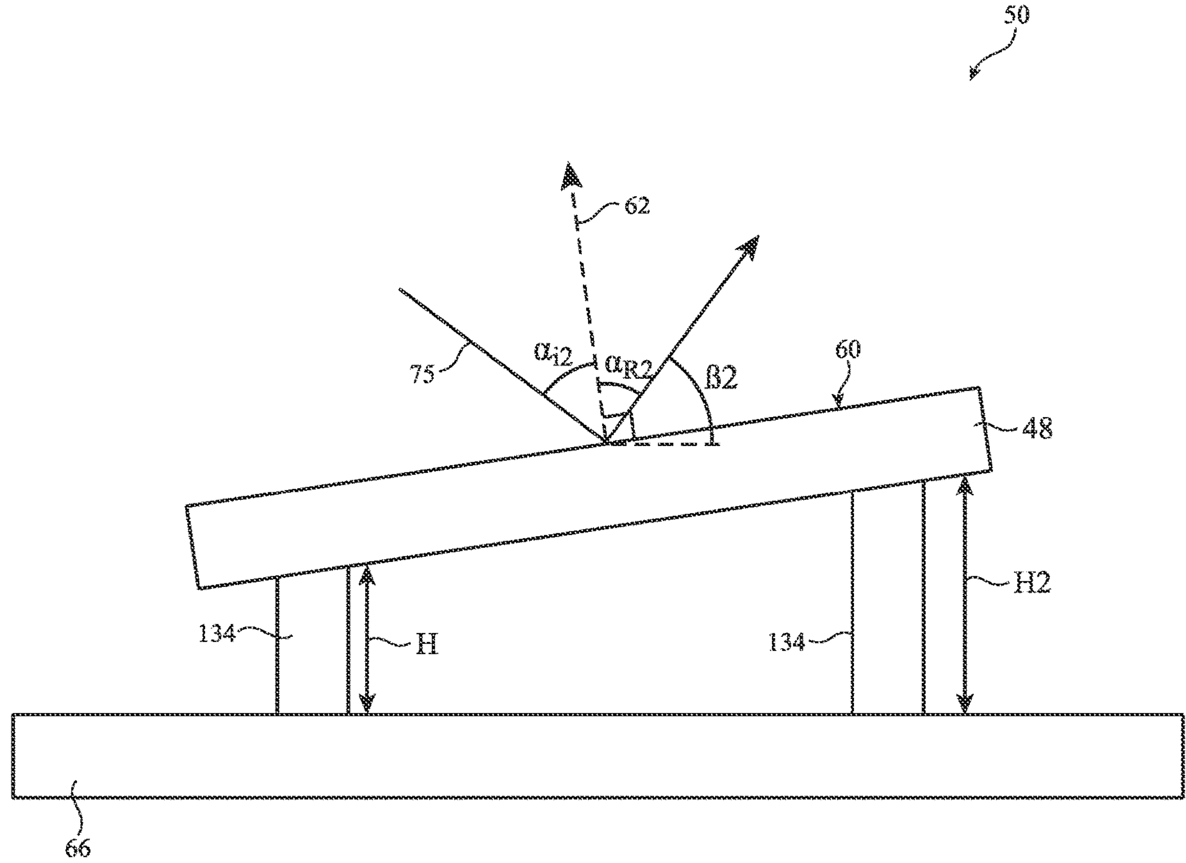
FIG. 11 is a side view showing how an illustrative adjustable reflector may be tilted to reflect incident radio-frequency signals in different directions in accordance with some embodiments.

If desired, electromechanical actuator(s) 134 may rotate or tilt reflector 48 to reflect AP beam at a different angle, thereby providing the reflected AP beam to a different location in area 78 of system 8 (FIG. 4). FIG. 11 is a side view showing one example of how electromechanical actuator(s) 134 may rotate or tilt reflector 48 so the reflective surface of reflector 48 no longer lies in a plane parallel with the horizontal axis. As shown in FIG. 11, electromechanical mechanical actuator(s) 134 may rotate or tilt reflector 48 such that the first (left) side of reflector 48 is located at distance H from support structures 66 whereas the second (right) side of reflector 48 is located at distance H2 from support structures 66. This configures the reflective surface 60 of reflector 48 to lie within a plane oriented at a non-parallel angle with respect to the horizontal axis of FIG. 11.

The incident AP beam 75 may reflect off reflector 48 about normal axis 62 of reflector 48. AP beam 75 may be incident on reflector 48 at incident angle $\alpha_{i2}$ with respect to normal axis 62 when reflector 48 is tilted in this way. Reflector 48 may reflect signal beam 75 at output (reflected) angle $\alpha_{R2}$ with respect to normal axis 62 (e.g., on the side of normal axis 62 opposite to incident angle $\alpha_{i2}$). Reflector 48 may act as a radio-frequency mirror such that the magnitude of incident angle $\alpha_{i2}$ is equal to the magnitude of output angle $\alpha_{R2}$. This may serve to reflect AP beam 75 in a direction given by angle β2 with respect to the horizontal axis of FIG. 10. Angle β2 is different from (e.g., greater than) angle β1 of FIG. 10. As such, the tilted configuration (orientation) of FIG. 11 may serve to direct (reflect) AP beam in a different direction than the un-tilted configuration (orientation) of FIG. 10.

The control signals provided to electromechanical actuator(s) 134 may control electromechanical actuator(s) 134 to switch between the un-tilted orientation of FIG. 10 and the tilted orientation of FIG. 11. The control signals may also control the amount and/or direction (e.g., the particular angle in spherical coordinates) with which reflector 48 is tilted, thereby changing angle β to any desired value and allowing reflector 48 to reflect AP beam 75 to any desired location within area 78 of system 8 (FIG. 4). If desired, electromechanical actuator(s) 134 may additionally or alternatively control reflector 48 to impart a phase shift to the signals in AP beam 75.

Figure 12:
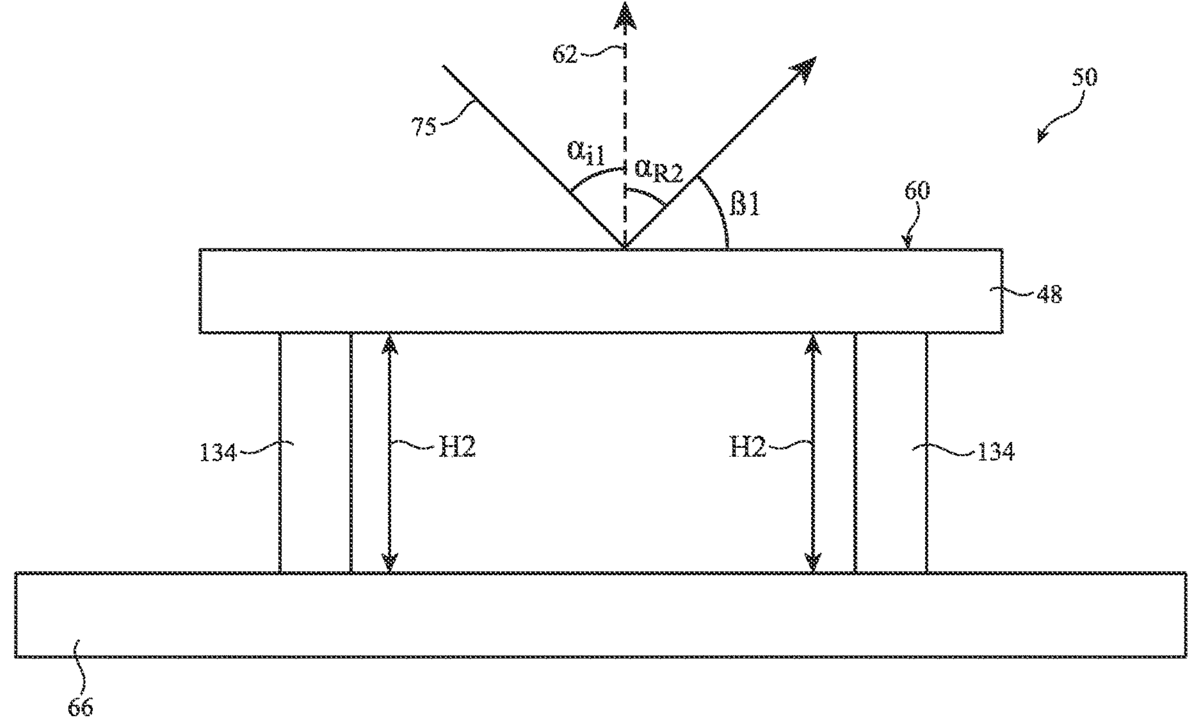
FIG. 12 is a side view showing how an illustrative adjustable reflector may be raised and lowered to adjust the phase of reflected radio-frequency signals in accordance with some embodiments.

FIG. 12 is a side view showing how electromechanical actuator(s) 134 may control reflector 48 to impart a phase shift to the signals in AP beam 75. As shown in FIG. 12, electromechanical actuator(s) 134 may adjust the overall distance of reflector 48 from support structures 66 to impart the signals in AP beam 75 with a selected phase shift. In the example of FIG. 12, electromechanical actuator(s) 134 have separated reflector 48 from support structures 66 by a uniform height H2 across its reflective surface 60 (e.g., in an un-tilted orientation). This may cause reflector 48 to impart the wireless signals in AP beam with a first phase upon reflection off of reflector 48. On the other hand, when electromechanical actuator(s) 134 have separated reflector 48 from support structures 66 by a uniform height H1 that is less than height H2 across its reflective surface (e.g., as shown in the un-tilted orientation of FIG. 10), reflector 48 to impart the wireless signals in AP beam 75 with a second phase upon reflection off of reflector 48 that is different from the first phase.

If desired, electromechanical actuator(s) 134 may impart a selected phase shift to AP beam 75 while in a tilted configuration (e.g., by changing the separation of reflector 48 from support structures 66 of FIG. 11 with by a uniform offset across reflective surface 60). By uniformly changing the separation of the entire reflective surface 60 of reflector 48 with respect to support structures 66, reflector 48 may be controlled to impart a selected phase shift to the reflected signals. If desired, different phase shifts may be applied across the reflectors 48 on reflective device 50 to configure multiple reflected beams to constructively/destructively interfere (e.g., to perform beamforming), to minimize interference between the beams, or for any other desired purposes. While the examples of FIGS. 10-12 illustrate downlink transmission of wireless signals 46 from AP 34 to UE device(s) 10 via reflector 48 for the sake of simplicity, reflector 48 may conversely reflect wireless signals 46 during uplink transmission of wireless signals 46 from UE device(s) 10 to AP 34 (e.g., the AP beam 75 of FIGS. 10-12 may be equivalently replaced with a UE beam).

Figure 13:
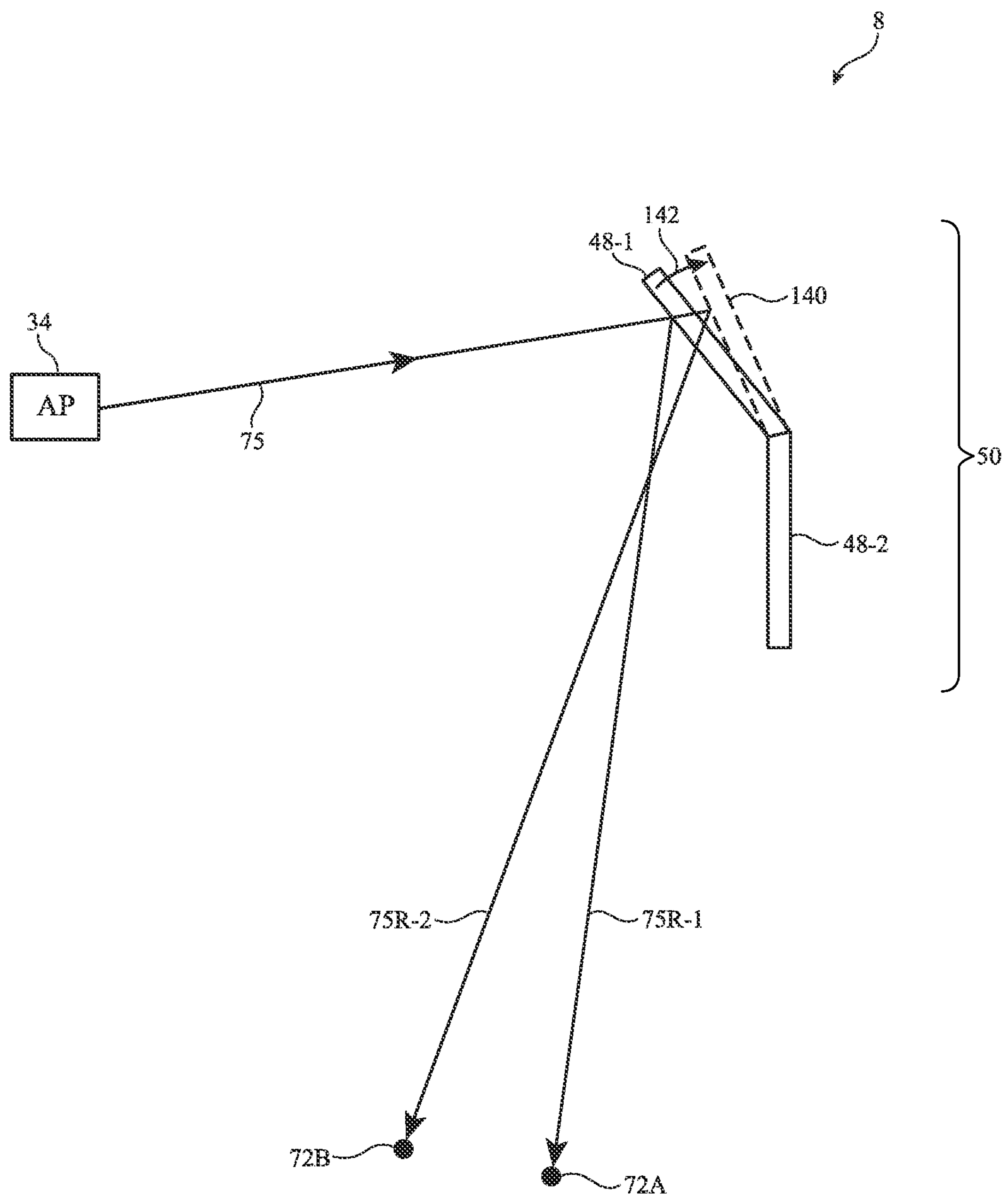
FIG. 13 is a top view showing how an illustrative adjustable reflector may be adjusted to reflect incident radio-frequency signals to different locations in accordance with some embodiments.

Electromechanical actuator(s) 134 may actively and dynamically adjust the orientation (angle) of reflector 48 to change the direction with which wireless signals 46 are directed/reflected within area 78 of system 8 (e.g., while establishing a wireless link between UE device 10 and AP 34 via reflective device 50 and/or while tracking UE device 10 after a wireless link has already been established). FIG. 13 is a top view showing how the orientation of reflector 48 may be adjusted to change the direction with which wireless signals 46 are directed/reflected in system 8.

As shown in FIG. 13, reflective device 50 may include at least a first reflector 48-1 and a second reflector 48-2. At least first reflector 48-1 may be electrically adjustable (support structures 66 and electromechanical actuator(s) 134 have been omitted from FIG. 13 for the sake of clarity). When reflector 48-1 has a first orientation (e.g., is oriented or tilted at a first angle with respect to the support structure), reflector 48-1 may reflect an incident AP beam 75 as reflected AP beam 75R-1, which is pointed in a first direction towards a first location 72A in system 8. The electromechanical actuator(s) may change the orientation/angle of reflector 48-1 (e.g., may rotate reflector 48-1) to a different orientation orientation/angle 140, as shown by arrow 142. When reflector 48-1 has the second orientation (e.g., is oriented or tilted at a second angle with respect to the support structure), reflector 48-1 may reflect the incident AP beam 75 as reflected AP beam 75R-2, which is pointed in a second direction towards a first location 72B in system 8.

AP 34 and/or UE device 10 may use the control RAT to instruct reflective device 50 when and how to rotate reflector 48-1. During UE tracking, for example, reflector 48-1 may be rotated from the first orientation to the second orientation when UE device 10 moves from location 72A to location 72B in system 8. If desired, reflector 48-1 may be rapidly toggled or switched between the first and second orientations to allow AP 34 to convey wireless signals 46 with both a first UE device 10 at location 72A and a second UE device 10 that is concurrently at location 72B (e.g., using a time division multiplexing scheme). While the example of FIG. 13 illustrates downlink transmission of wireless signals 46 from AP 34 via reflector 48 for the sake of simplicity, reflector 48 may conversely reflect wireless signals 46 during uplink transmission of wireless signals 46 from UE device(s) 10 (e.g., at locations 72A or 72B) to AP 34 (e.g., the AP beam 75 of FIG. 13 may be equivalently replaced with a UE beam). The angles/orientations of reflectors 48 may sometimes be referred to herein as reflector angles/orientations.

During the initial establishment of a wireless link between UE device 10 and AP 34 via reflective device 50, reflector 48-1 may be swept through different orientations while AP 34 searches for UE device 10 within system 8 over the data RAT (e.g., AP 34 may sweep through reflectors 48 and orientations of the reflectors to cover each location within system 8 while attempting to discover UE device 10).

Figure 14:
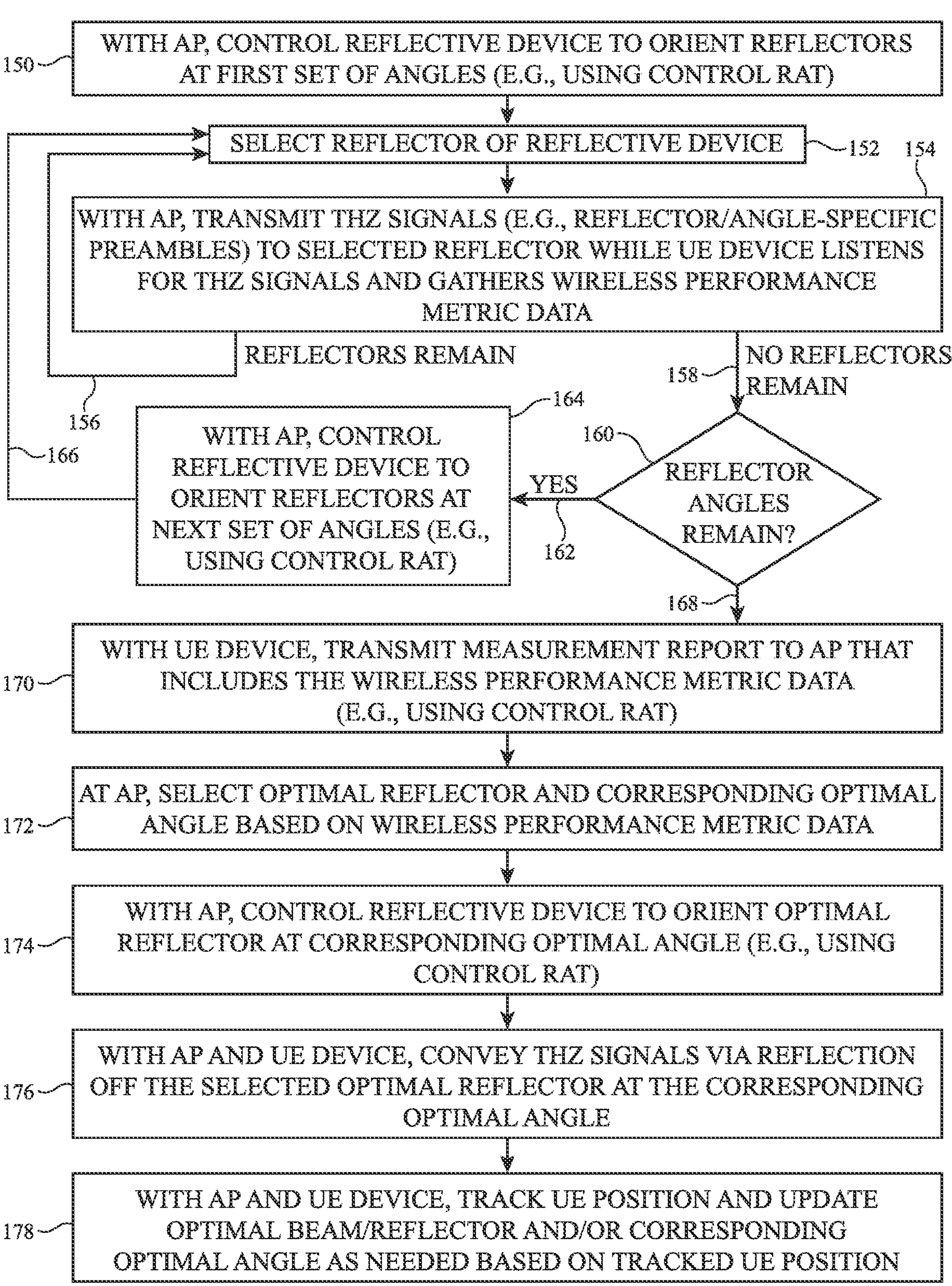
FIG. 14 is a flow chart of illustrative operations involved in establishing and maintaining wireless communications between an AP and a UE device via reflection of radio-frequency signals off a reflective device having adjustable reflectors in accordance with some embodiments.

FIG. 14 is a flow chart of illustrative operations involved in establishing and maintaining wireless communications between an AP 34 and UE device 10 via reflection of wireless signals 46 off reflective device 50 in implementations where reflective device 50 includes electrically adjustable reflectors 48 (e.g., reflectors coupled to support structures 66 using electromechanical actuator(s) 134 of FIGS. 10-12). The operations of FIG. 14 may be performed after AP 34 and reflective device 50 have been installed in system 8, after AP 34 has calibrated the position/orientation of reflective device 50 (e.g., at operation 100 of FIG. 7), after a UE device 10 has entered the system but that does not have a LOS path to AP 34, and after the AP and UE device have been placed into a selection mode (e.g., at operation 102 of FIG. 7), for example.

At operation 150, AP 34 may control reflective device 50 to place the reflectors 48 in reflective device 50 in a first set of angles/orientations. AP 34 may control reflective device 50 to place the reflectors 48 in reflective device 50 in the first set of angles/orientation using the control RAT, for example.

At operation 152, AP 34 may begin a sweep/scan of AP beams using two nested control loops: a first loop over different reflectors 48 in reflective device 50 and a second loop over different sets of angles/orientations of reflectors 48. As a part of the first loop, AP 34 may select one of the reflectors 48 on reflective device 50.

At operation 154, AP 34 may transmit wireless signals 46 towards the selected reflector 48 (e.g., within the AP beam 75 overlapping the selected reflector 48). The selected reflector may be in a corresponding angle/orientation of the first set of angles/orientations. The wireless signals may include a very short pre-amble that is specific/unique to the particular selected reflector 48 and the corresponding angle/orientation of the selected reflector (e.g., the preamble may be a reflector and angle-specific preamble). UE device 10 may concurrently listen for the wireless signals 46 transmitted by AP 34. UE device 10 may sweep over different UE beams while listening for the wireless signals 46 if desired (e.g., during each iteration of operation 154). While listening for wireless signals 46, UE device 10 may gather wireless performance metric data indicative of whether UE device 10 received the transmitted wireless signals 46 that reflected off the selected reflector 48.

If reflectors 48 remain in reflective device 50 for testing, processing may loop back to operation 152 via path 156 and AP 34 may select a subsequent reflector 48 in reflective device 50 to reflect wireless signals 46. AP 34 may transmit a different respective preamble in the wireless signals 46 to each selected reflector 48 and UE device 10 may continue to listen for wireless signals 46 while gathering wireless performance metric data. AP 34 may continue to sweep/scan over different reflectors 48 in reflective device 50 until no reflectors 48 remain in reflective device 50, at which point processing may proceed to operation 160 via path 158 (e.g., to begin to iterate over the second loop).

At operation 160, AP 34 may determine whether sets of angles/orientations for the reflectors 48 in reflective device 50 remain If sets of angles/orientations for the reflectors 48 in reflective device 50 remain, processing may proceed to operation 164 via path 162.

At operation 164, AP 34 may control reflective device 50 to place the reflectors 48 in reflective device 50 in a subsequent (next) set of angles/orientations. AP 34 may control reflective device 50 to place the reflectors 48 in reflective device 50 in the subsequent set of angles/orientations using the control RAT, for example. Processing may then loop back to operation 152 via path 166 and AP 34 may sweep over the reflectors 48 while oriented in the subsequent set of angles/orientations (e.g., while transmitting reflector and angle-specific preambles to each respective reflector). This process may continue until no sets of angles/orientations of reflectors 48 remain, at which point processing may proceed from operation 160 to operation 170 via path 168.

The example of FIG. 14 in which AP 34 sweeps over an inner loop of reflectors and an outer loop of reflector angles/orientations is illustrative and non-limiting. In other implementations, AP 34 may sweep over an inner loop of reflector angles/orientations and an outer loop of reflectors. In these implementations, AP 34 may transmit wireless signals 46 to a given reflector 48 and may control reflective device 50 to sweep that reflector 48 through each of its available angles/orientations (e.g., while transmitting a different reflector and angle-specific preamble while the reflector 48 is in each of its available angles/orientations) before transmitting wireless signals 46 to the next reflector. If desired, AP 34 may control reflective device 50 prior to transmitting wireless signals 46 to switch its reflectors 48 between different sets of angles/orientations at predetermined times that are time-synchronized with the sweep of AP beams and the transmission of reflector and angle-specific preambles by AP 34, rather than instructing reflective device 50 to switch angles/orientations at the beginning of each iteration of the outer loop. In these implementations, operation 164 may be omitted, for example.

At operation 170, UE device 10 may transmit its measurement report (or other feedback signals) to AP 34. The measurement report or other feedback signals may include (identify) the wireless performance metric data gathered while AP 34 swept over AP beams 75, reflectors 48, and sets of reflector angles/orientations. The wireless performance metric data in the measurement report or other feedback signals may include information identifying any preamble (or the preamble itself) that was successfully received (e.g., decoded) at UE device 10 during the sweep/scan over AP beams 75, reflectors 48, and reflector angles/orientations. Since each transmitted preamble is specific to a corresponding one of reflectors 48 and a corresponding angle/orientation from one of the sets of angles/orientations (e.g., was reflected by a corresponding one of reflectors 48 while oriented at a corresponding angle/orientation), the information identifying the preamble may help AP 34 to determine which reflector 48 and which angle/orientation of that reflector successfully reflected wireless signals 46 towards the current location of UE device 10. UE device 10 may, for example, use control RAT CR to transmit the measurement report or other feedback signals to AP 34 or may use the data RAT to transmit the feedback signals to AP 34.

At operation 172, AP 34 may select an optimal reflector 48, a corresponding optimal AP beam 75, and a corresponding optimal angle/orientation of the optimal reflector based on the measurement report or other feedback signals received from UE device 10. AP 34 may, for example, select the reflector 48, AP beam 75, and reflector angle/orientation of the reflector corresponding to the preamble identified in the measurement report or other feedback signals as the optimal reflector, AP beam, and reflector angle/orientation, respectively. If desired, AP 34 may select the optimal reflector 48, AP beam and reflector angle/orientation by comparing other wireless performance metric data gathered by UE device 10 and included in the measurement report or other feedback signals to one or more threshold values. If desired, AP 34 may use control RAT CR to inform UE device 10 of the selected optimal reflector 48, AP beam 75, and/or reflector angle/orientation.

At operation 174, AP 34 may control reflective device 50 to place the selected optimal reflector 48 in the corresponding selected optimal reflector angle/orientation (e.g., using the control RAT).

At operation 176, AP 34 and UE device 10 may convey wireless signals 46 via reflection off the selected optimal reflector 48 (e.g., using data RAT DR, sub-THz frequencies, MM/CM wave frequencies, etc.) while the selected optimal reflector 48 is oriented at the selected optimal reflector angle/orientation.

At operation 178, AP 34 and/or UE device may track the position of UE device 10 over time. AP 34 may update the selected optimal reflector 48 (and its corresponding AP beam 75) and/or the optimal reflector angle/orientation over time based on the tracked position of UE device 10 (e.g., using operations 120-124 of FIG. 7 while optionally varying reflector angle/orientation in addition to varying the active reflector while performing operation 120). Processing may, for example, loop back to operation 150 via a return path (not shown in FIG. 14 for the sake of clarity) similar to path 126 of FIG. 7.

The example of FIG. 14 is illustrative and non-limiting. If the LOS path between AP 34 and UE device 10 returns, AP 34 may reconfigure its antennas to use an AP beam that points towards UE device 10 and UE device 10 may reconfigure its antennas to use a UE beam that points towards AP 34. If desired, UE device 10 may transmit measurement reports or other feedback signals to AP 34 after each iteration of operation 154 rather than waiting until AP 34 has finished sweeping over all reflectors 48 and reflector angles/orientations on reflective device 50. The operations described herein as being performed by AP 34 may alternatively be performed by UE device 10 whereas the operations described herein as being performed by UE device 10 may be performed by AP 34 (e.g., the UE device may control establishment of data RAT communications with AP 34 via reflective device 50).

Figure 15:
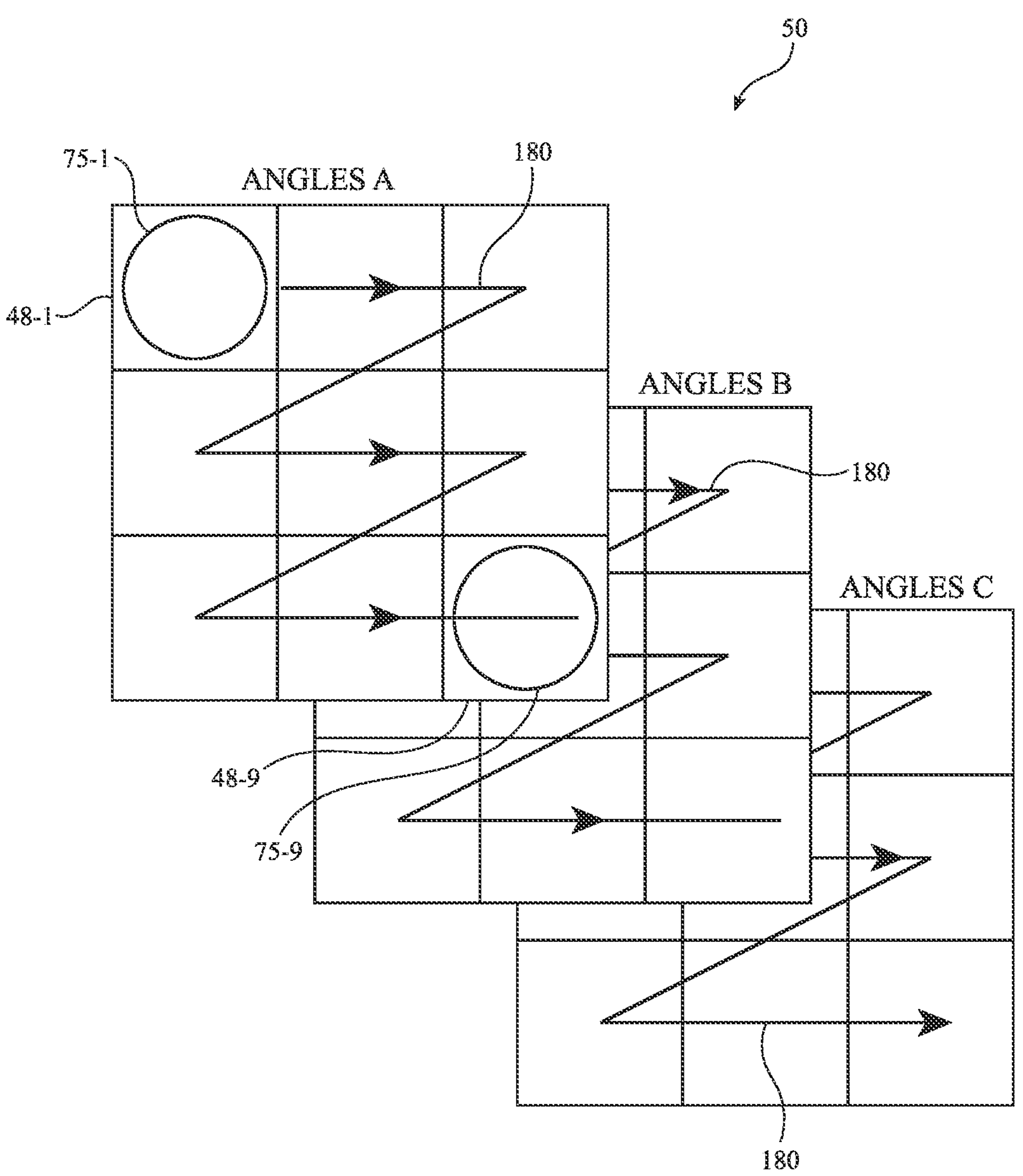
FIG. 15 is a front view of an illustrative reflective device showing how an AP may scan a signal beam across different reflectors under different orientations of the reflectors while establishing communications with a UE device in accordance with some embodiments.

FIG. 15 is a front view of reflective device 50 showing one example of how AP 34 may sweep/scan over different AP beams 75, reflectors 48, and reflector angles/orientations while establishing data RAT communications with UE device 10 via reflective device 50 (e.g., while iterating through operation 154 and the inner and outer loops of FIG. 14). AP 34 may sweep through AP beams 75 and corresponding reflectors 48 in any desired pattern. In the example of FIG. 15, while the reflectors 48 on reflective device 50 are oriented in a first set of angles/orientations A, AP 34 sweeps through reflectors 48 and AP beams 75 from a first AP beam 75-1 overlapping a first reflector 48-1 to a ninth AP beam 75-9 overlapping a ninth reflector 48-9 in a raster scan pattern, as shown by arrow 180.

Once each reflector has been scanned while the reflectors 48 on reflective device 50 are oriented in the first set of angles/orientations A, AP 34 may control reflective device 50 to rotate its reflectors 48 into a second set of angles/orientations B (e.g., in a second iteration of the outer loop of FIG. 14). AP 34 may then sweep through reflectors 48 and AP beams 75 from a first AP beam 75-1 overlapping a first reflector 48-1 to a ninth AP beam 75-9 overlapping a ninth reflector 48-9 in a raster scan pattern, as shown by arrow 180. Once each reflector has been scanned while the reflectors 48 on reflective device 50 are oriented in the second set of angles/orientations B, AP 34 may control reflective device 50 to rotate its reflectors 48 into a third set of angles/orientations C (e.g., in a third iteration of the outer loop of FIG. 14). AP 34 may then sweep through reflectors 48 and AP beams 75 from a first AP beam 75-1 overlapping a first reflector 48-1 to a ninth AP beam 75-9 overlapping a ninth reflector 48-9 in a raster scan pattern, as shown by arrow 180. This process may repeat until each available reflector angle/orientation has been tested or until any desired number of reflector angles/orientations have been tested for establishing communications with UE device 10. The scan pattern shown in FIG. 15 is illustrative and non-limiting. If desired, the beam scan and reflector tilt patterns may be different than as shown in FIG. 15. For example, the opposite tilt/orientation may be used when scanning a neighboring reflective tile, because that would be the closest angle, or a neighboring reflection may come from the same tile but with the next tilt level (similar to as shown in FIG. 9).

When reflectors 48 are electrically adjustable, as in the example of FIG. 15, rotating the reflectors between different reflector angles/orientations may allow reflective device 50 to effectively cover the same overall FOV as implementations where reflectors 48 are fixed but while requiring significantly fewer reflectors. The reflective device 50 shown in the example of FIG. 15, in which reflective device 50 includes nine electrically adjustable reflectors 48 may, for example, exhibit the same field of view as the reflective device 50 shown in the example of FIG. 8 when the reflectors 48 in the example of FIG. 8 are fixed. This may, for example, allow for a significant reduction in the overall size of reflective device 50 without sacrificing FOV or wireless performance in reflecting wireless signals 46. Consider one example in which fixed reflectors 48 can be shifted within a range of 2 degrees. This may require 45-by-45 fixed reflectors 48 to cover a sufficient FOV. If each reflector 48 is electrically adjustable between different angles/orientations within +/−5 degrees, the same FOV may be covered with an array of 10-by-10 reflectors 48.

Figure 16:
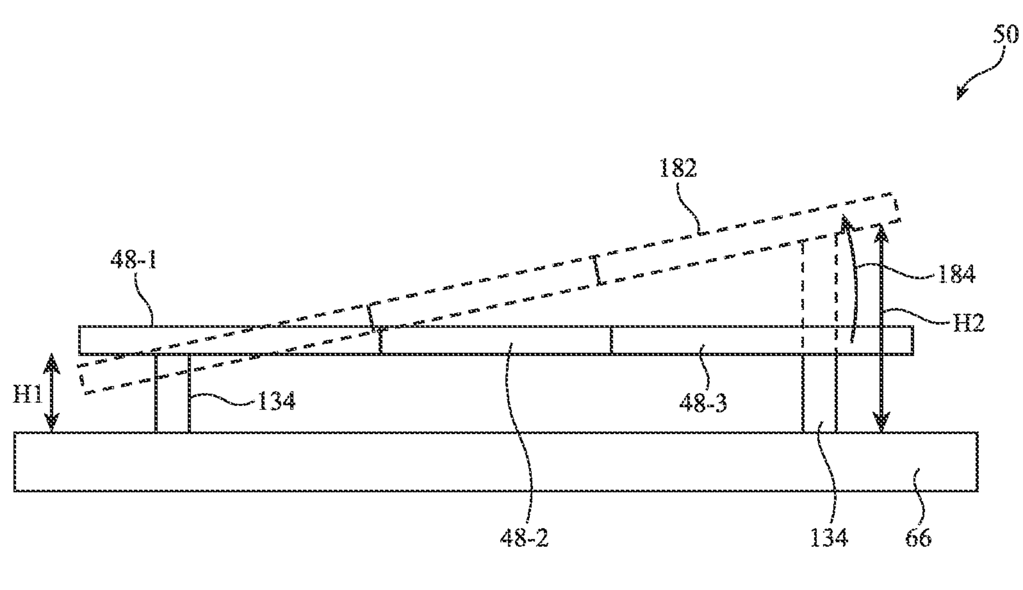
FIG. 16 is a side view showing how all of the reflectors in an illustrative reflective device may be rotated together in accordance with some embodiments.

If desired, some of the reflectors 48 in reflective device 50 may be fixed whereas other reflectors 48 in reflective device 50 are electrically adjustable. If desired, electromechanical actuator(s) 134 may rotate/tilt the entire array of reflectors 48 in reflective device 50. FIG. 16 is a side view showing one example of how electromechanical actuator(s) 134 may rotate/tilt the entire array of reflectors 48 in reflective device 50. This may serve to minimize hardware effort for reflector adjustment but may reduce the number of possible settings for reflective device 50.

As shown in FIG. 16, electromechanical actuator(s) 134 may rotate/tilt the entire array of reflectors 48 about support structures 66, between at least an un-tilted orientation in which both the first side (edge) (e.g., reflector 48-1) and the second side (edge) (e.g., reflector 48-3) of reflective device 50 is separated from support structures 66 by distance H1, and a tilted orientation 182, as shown by arrow 184. In the tilted orientation, the first side (edge) of reflective device 50 may be located at distance H1 from support structures 66 while the second side (edge) of reflective device 50 is located at a greater distance H2 from support structures 66. Electromechanical actuator(s) 134 may additionally or alternatively change the separation of the array of reflectors 48 by a uniform amount across its reflective surface to impart the reflected signals with a desired phase shift.

Figure 17:
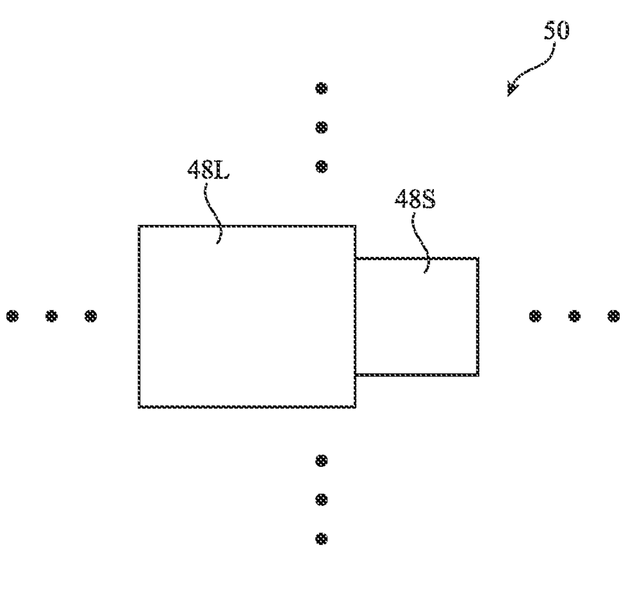
FIG. 17 is a side view showing how an illustrative reflective device may have reflectors of different sizes in accordance with some embodiments.

If desired, reflective device 50 may include reflectors 48 having different dimensions, shapes, and/or sizes. FIG. 17 is a front view showing one example of how reflective device 50 may include reflectors 48 having different sizes. As shown in FIG. 17, reflective device 50 may include at least a first set of reflectors 48L having a first size (surface area) and a second set of reflectors 48S having a second size (surface area) that is smaller than the first size. Reflectors 48L and reflectors 48S may be grouped together on reflective 50, may be interleaved or interspersed among each other, or may be arranged in any desired pattern. Reflectors 48S may be used to cover broader reflection beams than reflectors 48L and may thus be used to speed up the initial beam search whereas reflectors 48L are used for UE tracking, for example. In general, the reflectors 48 in reflective device 50 may have any desired shapes and sizes and reflective device 50 may include any desired number of sets of reflectors 48 having different shapes, sizes, and/or dimensions.

As used herein, the term "concurrent" means at least partially overlapping in time. In other words, first and second events are referred to herein as being "concurrent" with each other if at least some of the first event occurs at the same time as at least some of the second event (e.g., if at least some of the first event occurs during, while, or when at least some of the second event occurs). First and second events can be concurrent if the first and second events are simultaneous (e.g., if the entire duration of the first event overlaps the entire duration of the second event in time) but can also be concurrent if the first and second events are non-simultaneous (e.g., if the first event starts before or after the start of the second event, if the first event ends before or after the end of the second event, or if the first and second events are partially non-overlapping in time). As used herein, the term "while" is synonymous with "concurrent."

UE device 10 may gather and/or use personally identifiable information. It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The methods and operations described above in connection with FIGS. 1-17 may be performed by the components of UE device 10, reflective device 50, and/or AP 34 using software, firmware, and/or hardware (e.g., dedicated circuitry or hardware). Software code for performing these operations may be stored on non-transitory computer readable storage media (e.g., tangible computer readable storage media) stored on one or more of the components of UE device 10, reflective device 50, and/or AP 34. The software code may sometimes be referred to as software, data, instructions, program instructions, or code. The non-transitory computer readable storage media may include drives, non-volatile memory such as non-volatile random-access memory (NVRAM), removable flash drives or other removable media, other types of random-access memory, etc. Software stored on the non-transitory computer readable storage media may be executed by processing circuitry on one or more of the components of UE device 10, reflective device 50, and/or AP 34. The processing circuitry may include microprocessors, central processing units (CPUs), application-specific integrated circuits with processing circuitry, or other processing circuitry.

For one or more aspects, at least one of the components set forth in one or more of the preceding figures may be configured to perform one or more operations, techniques, processes, or methods as set forth in the example section below. For example, circuitry associated with a UE device, base station, access point, network element, reflective device, one or more processors, etc. as described above in connection with one or more of the preceding figures may be configured to operate in accordance with one or more of the examples set forth below in the example section.

EXAMPLES

In the following sections, further exemplary aspects are provided.

Example 1 includes a method of operating a wireless access point to communicate with a user equipment device, the method comprising: transmitting, using a transmitter, a first signal to a first reflector on a reflective device concurrent with the first reflector having a first orientation; transmitting, using the transmitter, a second signal to a second reflector on the reflective device concurrent with the second reflector having a second orientation different from the first orientation; and conveying, using one or more antennas, wireless data with the user equipment device via reflection off the first reflector.

Example 2 includes the method of example 1 or some other example or combination of examples herein, further comprising: transmitting, using the transmitter, a third signal to the first reflector while the first reflector has a third orientation different from the first orientation; and transmitting, using the transmitter, a fourth signal to the second reflector while the second reflector has a fourth orientation different from the second orientation.

Example 3 includes the method of any one of examples 1 or 2 or some other example or combination of examples herein, further comprising: wirelessly transmitting control signals to the reflective device that instruct the reflective device to adjust the first reflector from the first orientation to the third orientation and that instruct the reflective device to adjust the second reflector from the second orientation to the fourth orientation.

Example 4 includes the method of any one of examples 1-3 or some other example or combination of examples herein, wherein the first signal comprises a first preamble, the second signal comprises a second preamble different from the first preamble, the third signal comprises a third preamble different from the first and second preambles, and the fourth signal comprises a fourth preamble different from the first, second, and third preambles.

Example 5 includes the method of any one of examples 1-4 or some other example or combination of examples herein, wherein conveying the wireless data comprises conveying the wireless data when the wireless access point receives information indicating that the user equipment device has received the first signal.

Example 6 includes the method of any one of examples 1-5 or some other example or combination of examples herein, further comprising: conveying, using the one or more antennas, additional wireless data with the user equipment device via reflection off the second reflector after conveying the wireless data with the user equipment device via reflection off the first reflector.

Example 7 includes the method of any one of examples 1-6 or some other example or combination of examples herein, further comprising: conveying, using the one or more antennas, additional wireless data with an additional user equipment device via reflection off the second reflector during first time periods, wherein conveying the wireless data with the user equipment device via reflection off the first reflector comprises conveying the wireless data with the user equipment device via reflection off the first reflector during second time periods interleaved with the first time periods.

Example 8 includes the method of any one of examples 1-7 or some other example or combination of examples herein, wherein transmitting the first signal comprises transmitting the first signal at a frequency greater than or equal to 100 THz.

Example 9 includes a method of operating a first electronic device to wirelessly communicate with a second electronic device, the method comprising: transmitting, using one or more antennas, wireless signals within a set of signal beams, each signal beam in the set of signal beams pointing towards a different respective reflector on a reflective device; receiving, using a receiver, a feedback signal associated with the wireless signals from the second electronic device; and transmitting, using the one or more antennas, wireless data to the second electronic device within a selected signal beam from the set of signal beams, wherein the selected signal beam is selected based on the feedback signal and the wireless data is conveyed using radio-frequency signals reflected off a reflector on the reflective device that overlaps the selected signal beam.

Example 10 includes the method of example 9 or some other example or combination of examples herein, wherein transmitting the wireless signals comprises: controlling the reflective device to set a reflector on the reflective device to a corresponding orientation.

Example 11 includes the method of any one of example 9 or 10 or some other example or combination of examples herein, wherein transmitting the wireless signals comprises: controlling the reflective device to sweep the reflectors on the reflective device over sets of different reflector orientations; and sweeping the one or more antennas over the set of signal beams while the reflective device sweeps the reflectors over the sets of different reflector orientations.

Example 12 includes the method of any one of examples 9-11 or some other example or combination of examples herein, further comprising: receiving, using the receiver, sensor data from the second electronic device; and updating the selected signal beam based on the sensor data received from the second electronic device.

Example 13 includes the method of any one of examples 9-12 or some other example or combination of examples herein, further comprising: sweeping the one or more antennas over a subset of the signal beams, the subset of the signal beams surrounding the selected signal beam; receiving, using the receiver, an additional feedback signal from the second electronic device after sweeping over the subset of the signal beams; and updating the selected signal beam to one of the signal beams in the subset of signal beams based on the additional feedback signal received from the second electronic device.

Example 14 includes the method of any one of examples 9-13 or some other example or combination of examples herein, wherein transmitting the wireless signals comprises transmitting a different respective preamble using each of the signal beams in the set of signal beams Example 15 includes the method of any one of examples 9-14 or some other example or combination of examples herein, wherein the selected signal beam is selected based on preamble information included in the feedback signal received from the second electronic device.

Example 16 includes the method of any one of examples 9-15 or some other example or combination of examples herein, further comprising: calibrating a position of the reflective device with respect to the first electronic device prior to transmitting the wireless signals.

Example 17 includes the method of any one of examples 9-16 or some other example or combination of examples herein, wherein calibrating the position comprises transmitting, using optics, optical signals to the reflective device and receiving, using the optics, reflected optical signals from the reflective device.

Example 18 includes the method of any one of examples 9-17 or some other example or combination of examples herein, wherein calibrating the position comprises receiving ultra-wideband signals from a set of ultra-wideband antennas on the reflective device.

Example 19 includes a wireless access point comprising: a phased antenna array, the phased antenna array being configured to use a first signal beam to convey wireless signals with a user equipment device via reflection of the wireless signals off a first reflective panel in an array of reflective panels on a reflective device, the first signal beam overlapping the first reflective panel; and one or more processors configured to sweep the phased antenna array over a set of signal beams, the signal beams in the set of signal beams overlapping reflective panels on the reflective device other than the first reflective panel, and update an active signal beam of the phased antenna array based on wireless performance metric data generated by the user equipment device while the phased antenna array swept over the set of signal beams.

Example 20 includes the wireless access point of example 19 or some other example or combination of examples herein, wherein the one or more processors is configured to wirelessly control the reflective device to change an orientation of the first reflective panel based on the wireless performance metric data.

Example 21 includes a reflective device comprising: a support; a first reflective panel having a first orientation relative to the support; and a second reflective panel having a second orientation relative to the support, wherein the second orientation is different from the first orientation, the first reflective panel and the second reflective panel being configured to reflect radio-frequency signals between a wireless access point and one or more user equipment (UE) devices.

Example 22 includes the reflective device of example 21 or some other example or combination of examples herein, further comprising: one or more actuators coupled to the first reflective panel; and one or more processors configured to control the one or more actuators to rotate the first reflective panel to a third orientation different from the first orientation.

Example 23 includes the reflective device of any one of examples 21 or 22 or some other example or combination of examples herein, further comprising: one or more additional actuators coupled to the second reflective panel, the one or more processors being configured to control the one or more additional actuators to rotate the second reflective panel to a fourth orientation different from the second orientation.

Example 24 includes the reflective device of any one of examples 21-23 or some other example or combination of examples herein, further comprising: an antenna, wherein the antenna is configured to receive a control signal that instructs the one or more processors to rotate the first reflective panel.

Example 25 includes the reflective device of any one of examples 21-24 or some other example or combination of examples herein, wherein the antenna is configured to receive the control signal at a first frequency less than 10 GHz and the first reflective panel and the second reflective panel are configured to reflect radio-frequency signals at a second frequency greater than or equal to 10 GHz.

Example 26 includes the reflective device of any one of examples 21-25 or some other example or combination of examples herein, wherein the second frequency is greater than or equal to 100 GHz.

Example 27 includes the reflective device of any one of examples 21-26 or some other example or combination of examples herein, wherein the one or more actuators is configured to control the first reflective panel to change a phase shift imparted to the radio-frequency signals upon reflection of the radio-frequency signals by the first reflective panel.

Example 28 includes the reflective device of any one of examples 21-27 or some other example or combination of examples herein, wherein the one or more actuators comprise a piezoelectric shifter.

Example 29 includes the reflective device of any one of examples 21-28 or some other example or combination of examples herein, wherein the first reflective panel and the second reflective panel have a width greater than or equal to ten times a wavelength of the radio-frequency signals.

Example 30 includes the reflective device of any one of examples 21-29 or some other example or combination of examples herein, wherein the first reflective panel is larger than the second reflective panel.

Example 31 includes the reflective device of any one of examples 21-30 or some other example or combination of examples herein, further comprising: a first laser reflection bubble on the first reflective panel; and a second laser reflection bubble on the second reflective panel.

Example 32 includes the reflective device of any one of examples 21-31 or some other example or combination of examples herein, further comprising: a first ultra-wideband antenna mounted to the first reflective panel; and a second ultra-wideband antenna mounted to the second reflective panel, the first ultra-wideband antenna and the second ultra-wideband antenna being configured to transmit ultra-wideband signals to the wireless access point.

Example 33 includes the reflective device of any one of examples 21-32 or some other example or combination of examples herein, further comprising: a third reflective panel having a third orientation relative to the support, the third orientation being different from the first and second orientations; and a fourth reflective panel having a fourth orientation relative to the support, wherein the fourth orientation is different from the first, second, and third orientations, the third reflective panel and the fourth reflective panel being configured to reflect the radio-frequency signals between the wireless access point and the one or more user equipment (UE) devices.

Example 34 includes a radio-frequency reflective device comprising: a support; and an array of reflective panels mounted to the support, wherein the array of reflective panels is configured to reflect radio-frequency signals at a frequency greater than or equal to 10 GHz between a first electronic device and a second electronic device and each reflective panel in the array of reflective panels has a respective field of view.

Example 35 includes the radio-frequency reflective device of example 34 or some other example or combination of examples herein, wherein the array of reflective panels comprises a first set of reflective panels that having fixed orientations and a second set of reflective panels having electrically adjustable orientations.

Example 36 includes the radio-frequency reflective device of any one of example 34 or 35 or some other example or combination of examples herein, further comprising: one or more electromechanical actuators coupled to the array of reflective panels and configured to rotate one or more of the reflective panels in the array of reflective panels with respect to the support.

Example 37 includes the radio-frequency reflective device of any one of examples 34-36 or some other example or combination of examples herein, wherein the one or more electromechanical actuators are configured to rotate an entirety of the array of reflective panels with respect to the support.

Example 38 includes the radio-frequency reflective device of any one of examples 34-37 or some other example or combination of examples herein, wherein the array of reflective panels comprises at least nine reflective panels.

Example 39 includes a method of operating a reflective device to convey wireless signals between a wireless access point and one or more user equipment (UE) devices, the method comprising: rotating, using one or more electromechanical actuators, reflectors in an array of reflectors to a first set of orientations with respect to a support structure; reflecting, using the array of reflectors, a set of signal beams from the wireless access point concurrent with the reflectors in the array of reflectors being in the first set of orientations, each signal beam in the set of signal beams overlapping a respective one of the reflectors in the array of reflectors; rotating, using the one or more electromechanical actuators, the reflectors in the array of reflectors from the first set of orientations to a second set of orientations with respect to the support structure that is different from the first set of orientations; and reflecting, using the array of reflectors, the set of signal beams from the wireless access point concurrent with the reflectors in the array of reflectors being in the second set of orientations.

Example 40 includes the method of example 39 or some other example or combination of examples herein, further comprising: receiving, using an antenna, a control signal from the wireless access point, wherein rotating the reflectors in the array of reflectors from the first set of orientations to the second orientations comprises rotating the reflectors in the array of reflectors based on the control signal received from the wireless access point.

Example 41 may include an apparatus comprising means to perform one or more elements of a method described in or related to any of examples 1-40 or any combination thereof, or any other method or process described herein.

Example 42 may include one or more non-transitory computer-readable media comprising instructions to cause an electronic device, upon execution of the instructions by one or more processors of the electronic device, to perform one or more elements of a method described in or related to any of examples 1-40 or any combination thereof, or any other method or process described herein.

Example 43 may include an apparatus comprising logic, modules, or circuitry to perform one or more elements of a method described in or related to any of examples 1-40 or any combination thereof, or any other method or process described herein.

Example 44 may include a method, technique, or process as described in or related to any of examples 1-40 or any combination thereof, or portions or parts thereof.

Example 45 may include an apparatus comprising: one or more processors and one or more non-transitory computer-readable storage media comprising instructions that, when executed by the one or more processors, cause the one or more processors to perform the method, techniques, or process as described in or related to any of examples 1-40, or any combination thereof, or portions thereof.

Example 46 may include a signal as described in or related to any of examples 1-40, or any combination thereof, or portions or parts thereof.

Example 47 may include a datagram, information element, packet, frame, segment, PDU, or message as described in or related to any of examples 1-40, or any combination thereof, or portions or parts thereof, or otherwise described in the present disclosure.

Example 47 may include a signal encoded with data as described in or related to any of examples 1-40, or any combination thereof, or portions or parts thereof, or otherwise described in the present disclosure.

Example 48 may include a signal encoded with a datagram, TE, packet, frame, segment, PDU, or message as described in or related to any of examples 1-40, or any combination thereof, or portions or parts thereof, or otherwise described in the present disclosure.

Example 49 may include an electromagnetic signal carrying computer-readable instructions, wherein execution of the computer-readable instructions by one or more processors is to cause the one or more processors to perform the method, techniques, or process as described in or related to any of examples 1-40, or any combination thereof, or portions thereof.

Example 50 may include a computer program comprising instructions, wherein execution of the program by a processing element is to cause the processing element to carry out the method, techniques, or process as described in or related to any of examples 1-40, or any combination thereof, or portions thereof.

Example 51 may include a signal in a wireless network as shown and described herein.

Example 52 may include a method of communicating in a wireless network as shown and described herein.

Example 53 may include a system for providing wireless communication as shown and described herein.

Example 54 may include a device for providing wireless communication as shown and described herein.

Any of the above-described examples may be combined with any other example (or combination of examples), unless explicitly stated otherwise. The foregoing description of one or more implementations provides illustration and description but is not intended to be exhaustive or to limit the scope of aspects to the precise form disclosed.

What is claimed is:

1. A reflective device comprising:

a support;

a first reflective panel having a first orientation relative to the support; and a second reflective panel having a second orientation relative to the support, wherein the second orientation is different from the first orientation, the first reflective panel and the second reflective panel being configured to reflect radio-frequency signals between a wireless access point and one or more user equipment (UE) devices;

one or more actuators coupled to the first reflective panel;

one or more processors configured to control the one or more actuators to rotate the first reflective panel to a third orientation different from the first orientation;

one or more additional actuators coupled to the second reflective panel, the one or more processors being configured to control the one or more additional actuators to rotate the second reflective panel to a fourth orientation different from the second orientation; and an antenna, wherein the antenna is configured to receive a control signal that instructs the one or more processors to rotate the first reflective panel.

2. The reflective device of claim 1, wherein the antenna is configured to receive the control signal at a first frequency less than 10 GHz and the first reflective panel and the second reflective panel are configured to reflect radio-frequency signals at a second frequency greater than or equal to 10 GHz.

3. The reflective device of claim 2, wherein the second frequency is greater than or equal to 100 GHz.

4. The reflective device of claim 1, wherein the one or more actuators is configured to control the first reflective panel to change a phase shift imparted to the radio-frequency signals upon reflection of the radio-frequency signals by the first reflective panel.

5. The reflective device of claim 1, wherein the one or more actuators comprise a piezoelectric shifter.

6. The reflective of claim 1, wherein the first reflective panel is larger than the second reflective panel.

7. The reflective device of claim 1, further comprising:
a first laser reflection bubble on the first reflective panel; and
a second laser reflection bubble on the second reflective panel.

8. The reflective device of claim 1, further comprising:
a first ultra-wideband antenna mounted to the first reflective panel; and
a second ultra-wideband antenna mounted to the second reflective panel, the first ultra-wideband antenna and the second ultra-wideband antenna being configured to transmit ultra-wideband signals to the wireless access point.

9. The reflective device of claim 1, further comprising:
a third reflective panel having a third orientation relative to the support, the third orientation being different from the first and second orientations; and
a fourth reflective panel having a fourth orientation relative to the support, wherein the fourth orientation is different from the first, second, and third orientations, the third reflective panel and the fourth reflective panel being configured to reflect the radio-frequency signals between the wireless access point and the one or more user equipment (UE) devices.

10. The reflective device of claim 1, further comprising:
an array of reflective panels mounted to the support, wherein the array of reflective panels includes the first reflective panel and the second reflective panel.

11. The reflective device of claim 10, wherein the first reflective panel has a first field of view and the second reflective panel has a second field of view different from the first field of view.

12. The reflective device of claim 11, wherein the first reflective panel the first orientation is a fixed orientation and the second orientation is an electrically adjustable orientation.

13. The reflective device of claim 11, further comprising:
one or more electromechanical actuators coupled to the array of reflective panels and configured to rotate one or more of the reflective panels in the array of reflective panels with respect to the support, wherein the one or more electromechanical actuators are configured to rotate an entirety of the array of reflective panels with respect to the support.

14. The reflective device of claim 11, wherein the array of reflective panels comprises at least nine reflective panels.

15. A reflective device comprising:
a support;
a first reflective panel having a first orientation relative to the support; and
a second reflective panel having a second orientation relative to the support, wherein the second orientation is different from the first orientation, the first reflective panel and the second reflective panel being configured to reflect radio-frequency signals between a wireless access point and one or more user equipment (UE) devices, wherein the first reflective panel and the second reflective panel have a width greater than or equal to ten times a wavelength of the radio-frequency signals.

16. The reflective device of claim 15, further comprising:
one or more processors;
one or more actuators coupled to the first reflective panel; and
an antenna, wherein the antenna is configured to receive a control signal that instructs the one or more processors to rotate the first reflective panel.

17. The reflective device of claim 15, wherein the first reflective panel is larger than the second reflective panel.

18. The reflective device of claim 15 further comprising:
a first ultra-wideband antenna mounted to the first reflective panel; and
a second ultra-wideband antenna mounted to the second reflective panel, the first ultra-wideband antenna and the second ultra-wideband antenna being configured to transmit ultra-wideband signals to the wireless access point.

19. Apparatus comprising:
a support;
a first panel having a first orientation relative to the support structure;
a second panel having a second orientation relative to the support, wherein the second orientation is different from the first orientation, the first panel and the second panel being configured to reflect radio-frequency signals between a first electronic device and a set of one or more additional electronic devices;
a first actuator coupled to the first reflective panel;
a second actuator coupled to the second reflective panel;
one or more processors configured to control the first actuator to rotate the first panel to a third orientation different from the first orientation and configured to control the second actuator to rotate the second panel to a fourth orientation different from the second orientation; and
an antenna, wherein the antenna is configured to receive a control signal that instructs the one or more processors to rotate the first panel.

20. The apparatus of claim 19, wherein the first panel and the second panel have a width greater than or equal to ten times a wavelength of the radio-frequency signals.

* * * * *